(12) United States Patent
Tabuchi

(10) Patent No.: US 6,920,264 B2
(45) Date of Patent: Jul. 19, 2005

(54) ARRAYED WAVEGUIDE GRATING TYPE WAVELENGTH DIVISION DEMULTIPLEXER

(75) Inventor: Haruhiko Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 10/351,399

(22) Filed: Jan. 27, 2003

(65) Prior Publication Data

US 2003/0228104 A1 Dec. 11, 2003

(30) Foreign Application Priority Data

Jun. 11, 2002 (JP) ........................................ 2002-170005

(51) Int. Cl.$^7$ ................................................ G02B 6/34
(52) U.S. Cl. .......................................... 385/37; 385/39
(58) Field of Search ..................................... 385/15–52

(56) References Cited

U.S. PATENT DOCUMENTS

| | | | |
|---|---|---|---|
| 6,741,772 B2 * | 5/2004 | Ide ............................... | 385/37 |
| 2002/0064339 A1 | 5/2002 | Chiba | |
| 2003/0118284 A1 * | 6/2003 | Ide ............................... | 385/37 |

FOREIGN PATENT DOCUMENTS

| | | |
|---|---|---|
| JP | HEI 4-298702 | 10/1992 |
| JP | 2000-155231 | 6/2000 |
| JP | 2002-62444 | 2/2002 |

OTHER PUBLICATIONS

Matsui, K., et al., "Low–loss and a–thermal AWG with high index regions at slab–to–array interface," Optoelectronics System Laboratory, Hitachi Cable, Ltd., p. 201 (with complete English translation).

Dong, L., et al., "Enhanced Photosensitivity in Tin–Codoped Germanosilicate Optical Fibers," IEEE Photonics Technology Letters, vol. 7, No. 9, pp. 1048–1050, Sep. 1995.

Erdogan, T., et al., "Decay of ultraviolet–induced fiber Bragg gratings," J. Appl. Phys, 76(1), 1994 American Institute of Physics, pp. 73–80, Jul. 1, 1994.

* cited by examiner

Primary Examiner—Frank G. Font
Assistant Examiner—Michael P. Mooney
(74) Attorney, Agent, or Firm—Staas & Halsey LLP

(57) ABSTRACT

In an arrayed waveguide grating type wavelength division demultiplexer including an input waveguide, an input slab waveguide, a phase-grating waveguide array composed of a plurality of optical channel waveguides, an output slab waveguide, and a plurality of output waveguides provided in a core layer so as to form a predetermined pattern, the input slab waveguide is configured to have portions with locally varied thickness in at least the core layer or the cladding layer at the vicinity of each coupling portion of the optical channel waveguide depending on the layout of the optical channel waveguides, whereby the input slab waveguide is made to have a high refractive index region having a refractive index relatively higher than surrounding regions thereof. With this arrangement of the device, the device can be applied to a case where it is undesirable to dope materials of Ge, Ti and Ce. Moreover, with this arrangement of the device, it becomes possible to avoid deterioration with time passage and reduce polarization dependent loss, thereby to improve optical coupling loss.

25 Claims, 24 Drawing Sheets

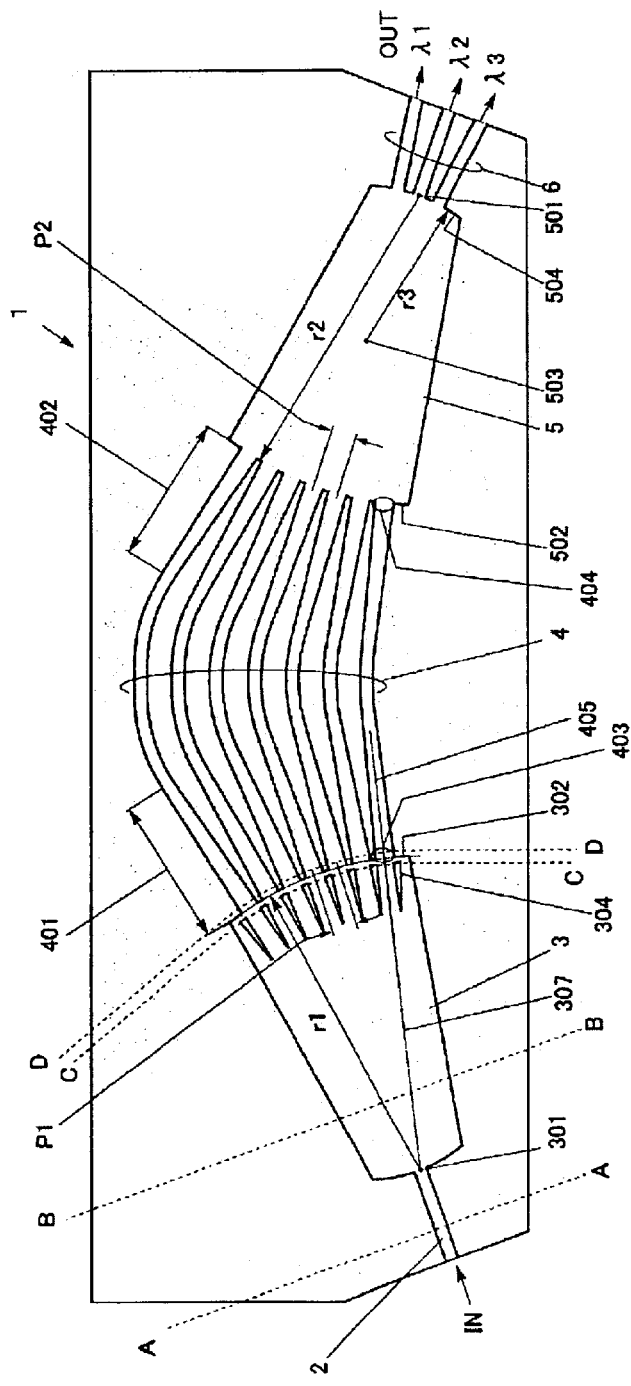
FIG. 1(a)
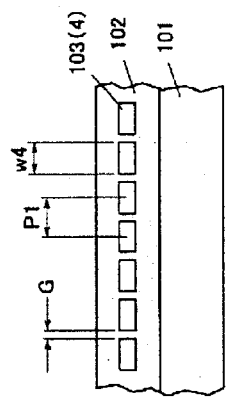
FIG. 1(e) CROSS-SECTIONAL VIEW TAKEN ALONG LINE D-D
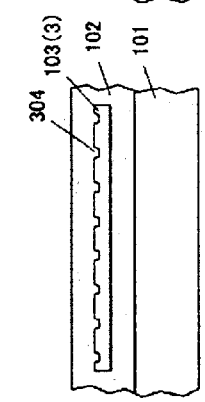
FIG. 1(d) CROSS-SECTIONAL VIEW TAKEN ALONG LINE C-C
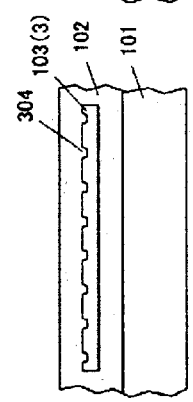
FIG. 1(c) CROSS-SECTIONAL VIEW TAKEN ALONG LINE B-B
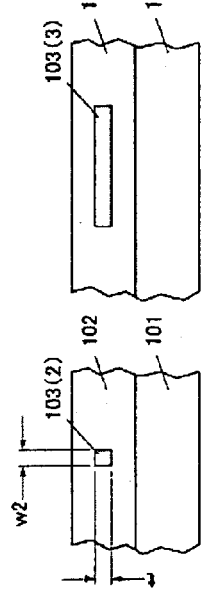
FIG. 1(b) CROSS-SECTIONAL VIEW TAKEN ALONG LINE A-A

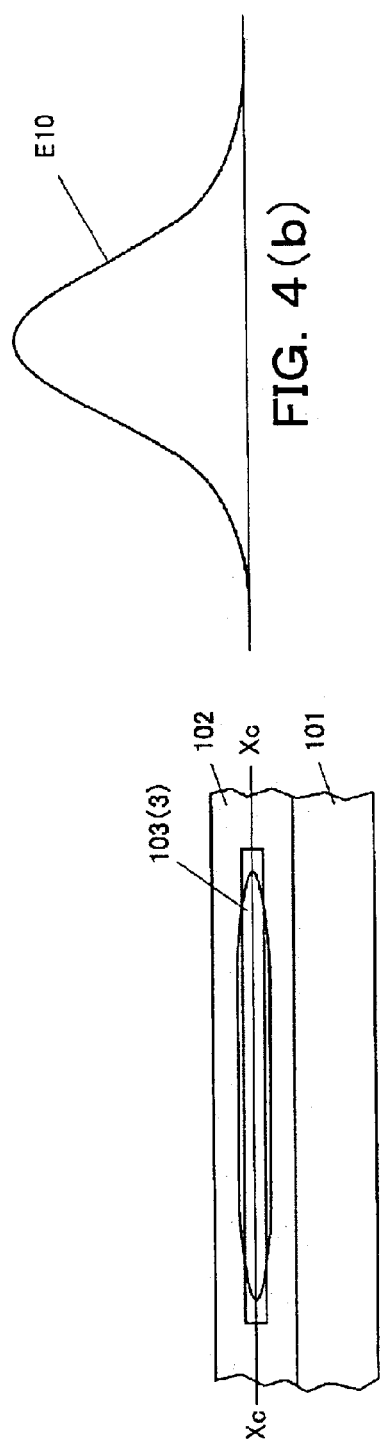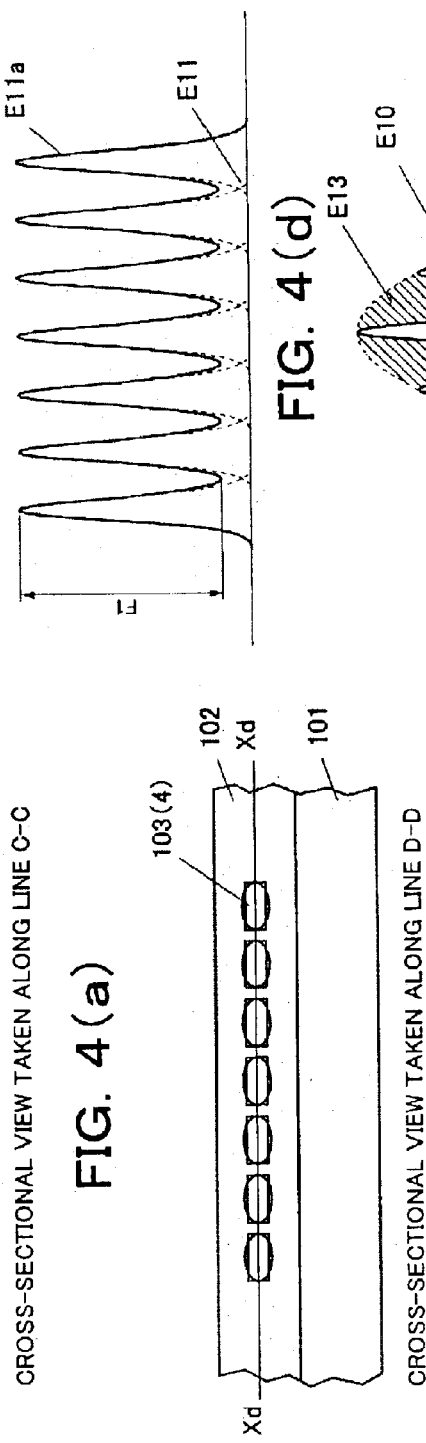

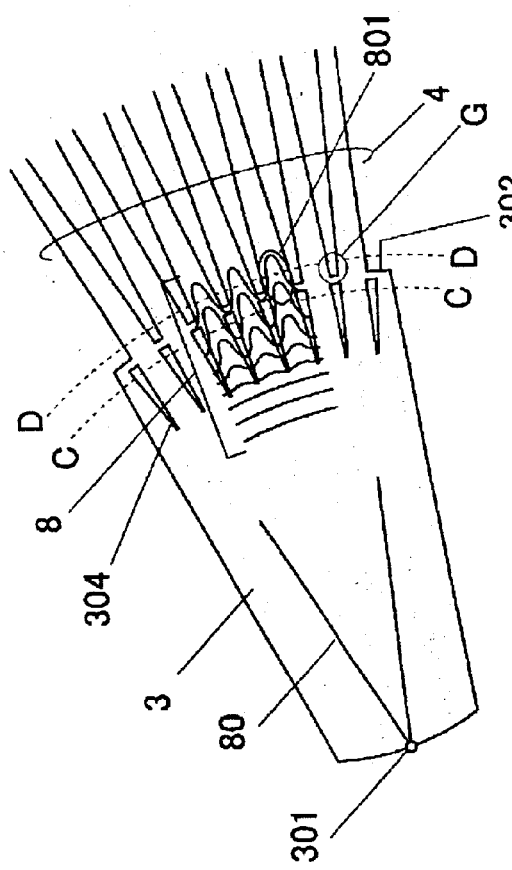
FIG. 5(a)
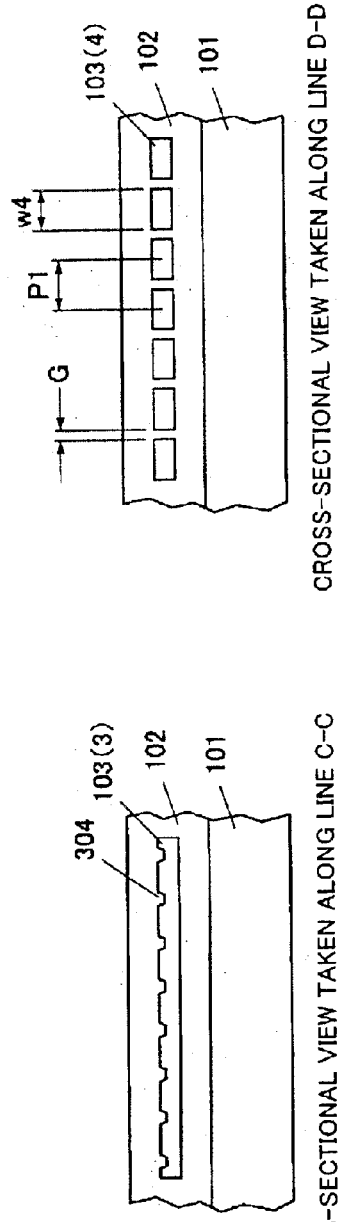
FIG. 5(b) CROSS-SECTIONAL VIEW TAKEN ALONG LINE C-C
FIG. 5(c) CROSS-SECTIONAL VIEW TAKEN ALONG LINE D-D

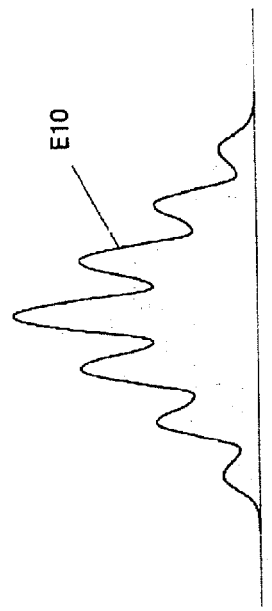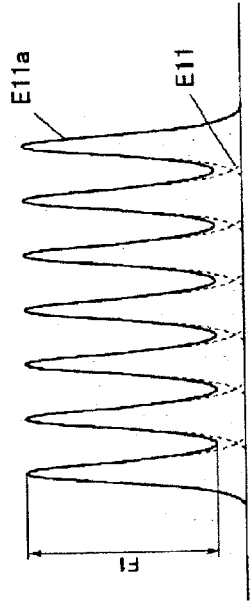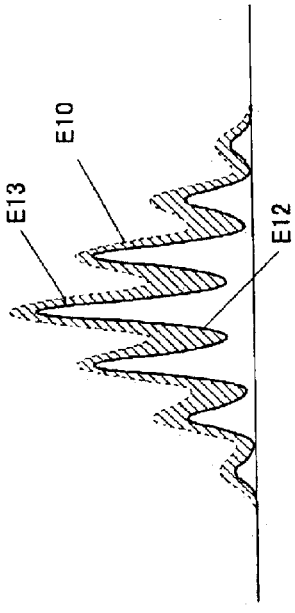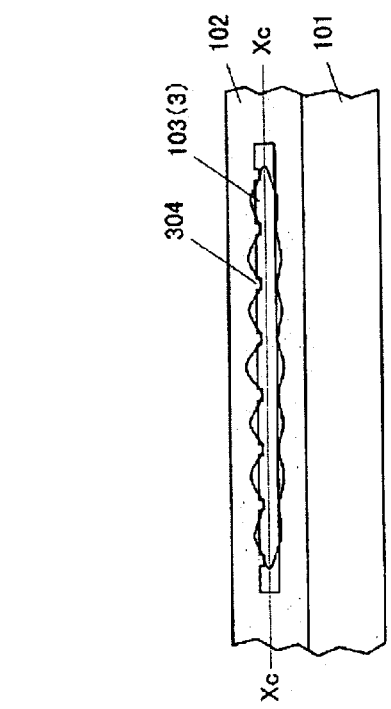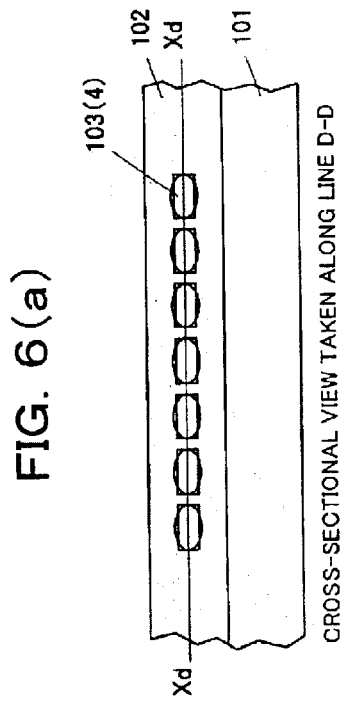

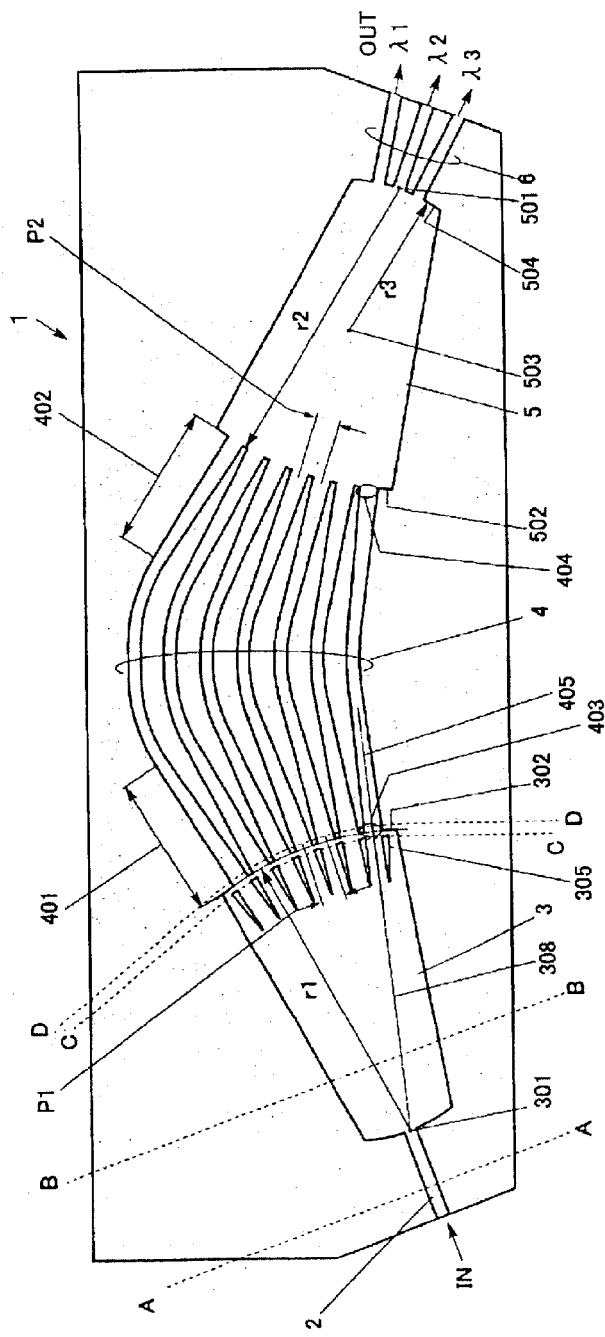
FIG. 8(a)
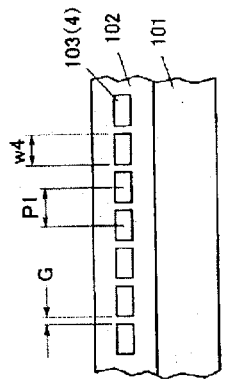
FIG. 8(b) CROSS-SECTIONAL VIEW TAKEN ALONG LINE A-A
FIG. 8(c) CROSS-SECTIONAL VIEW TAKEN ALONG LINE B-B
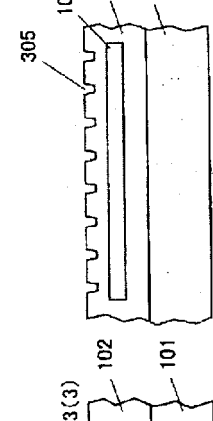
FIG. 8(d) CROSS-SECTIONAL VIEW TAKEN ALONG LINE C-C
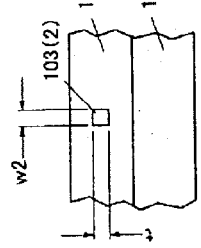
FIG. 8(e) CROSS-SECTIONAL VIEW TAKEN ALONG LINE D-D

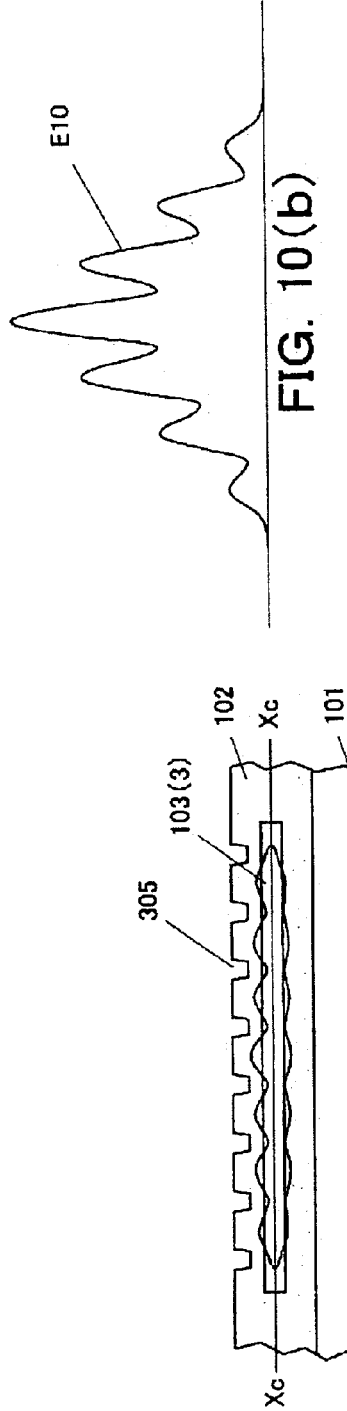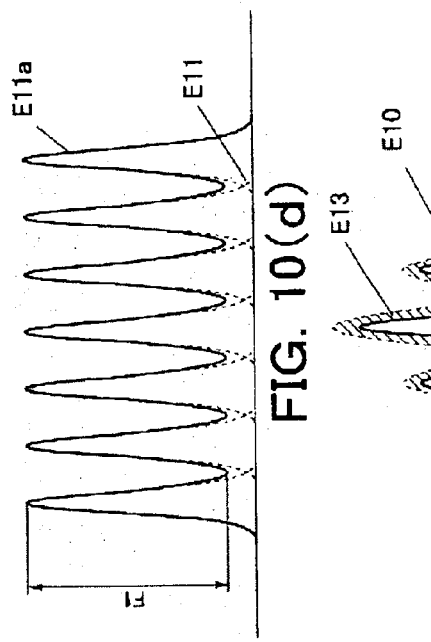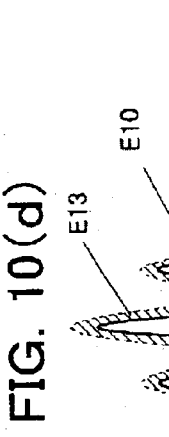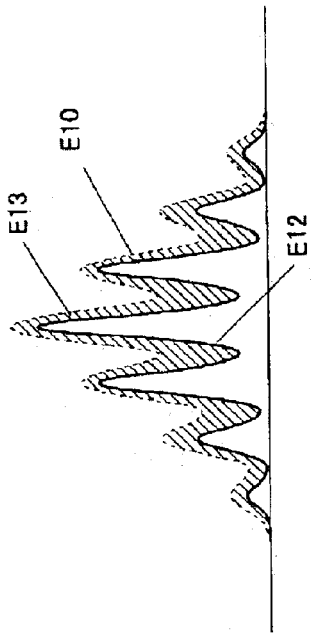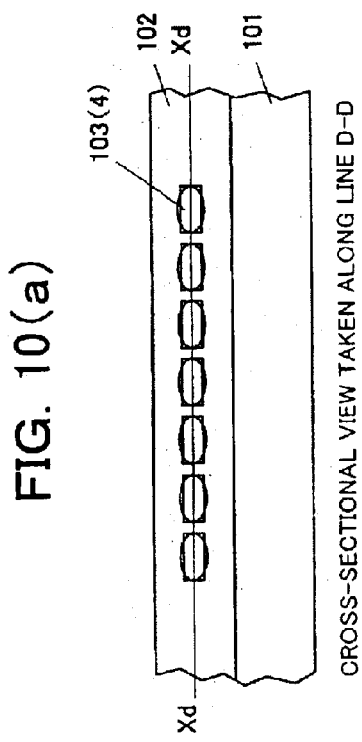

CROSS-SECTIONAL VIEW TAKEN ALONG LINE C-C

CROSS-SECTIONAL VIEW TAKEN ALONG LINE C-C

CROSS-SECTIONAL VIEW TAKEN ALONG LINE C-C

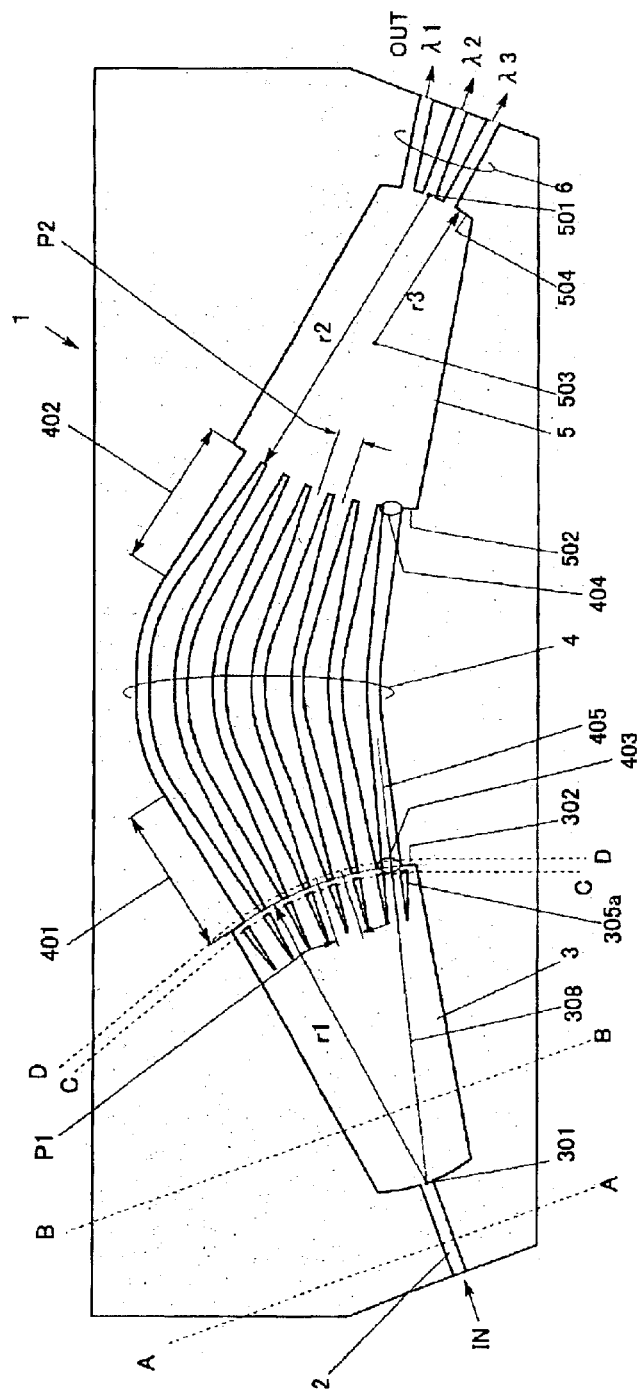
FIG. 12(a)
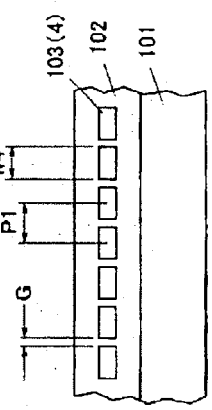
CROSS-SECTIONAL VIEW TAKEN ALONG LINE D-D
FIG. 12(e)
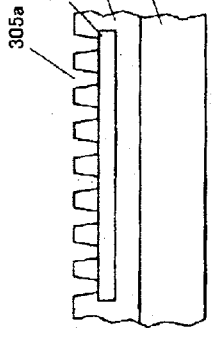
CROSS-SECTIONAL VIEW TAKEN ALONG LINE C-C
FIG. 12(d)
CROSS-SECTIONAL VIEW TAKEN ALONG LINE B-B
FIG. 12(c)
CROSS-SECTIONAL VIEW TAKEN ALONG LINE A-A
FIG. 12(b)

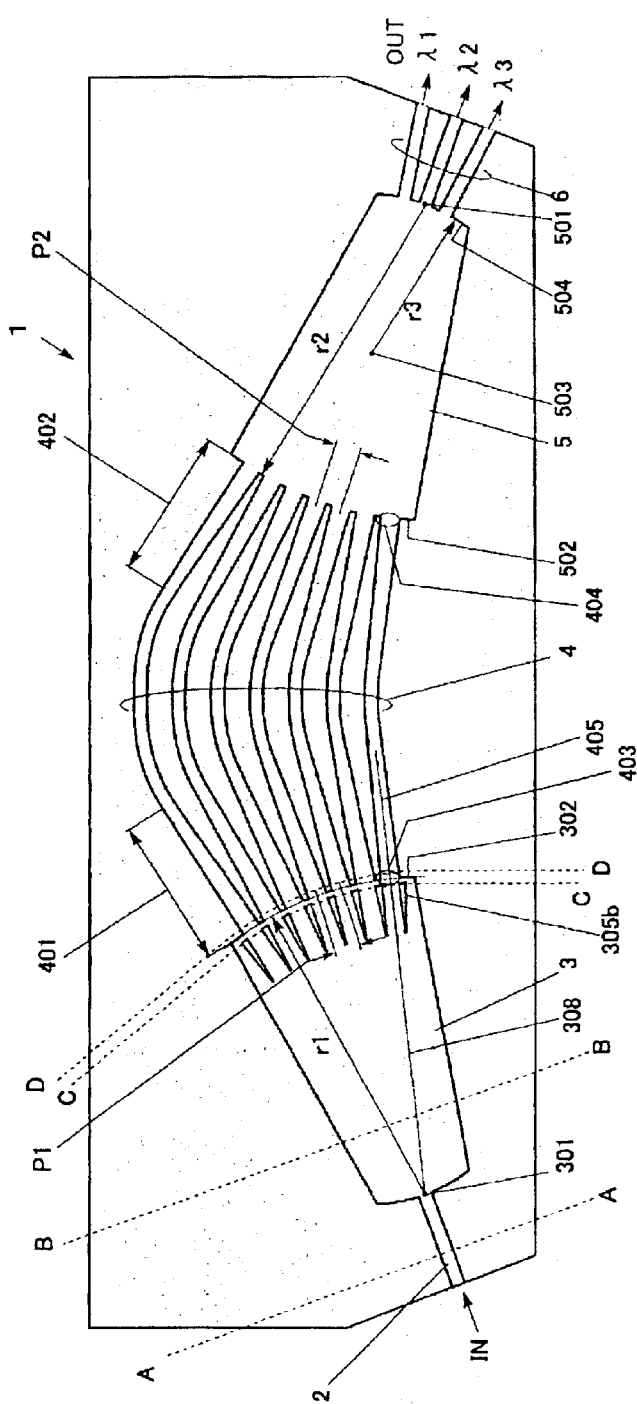
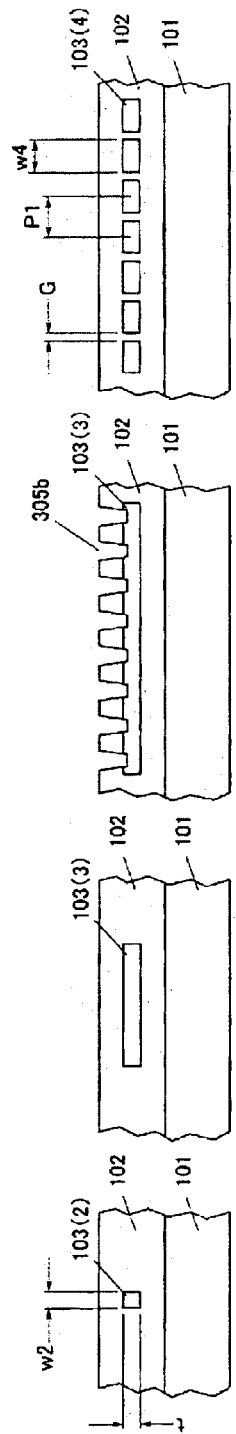

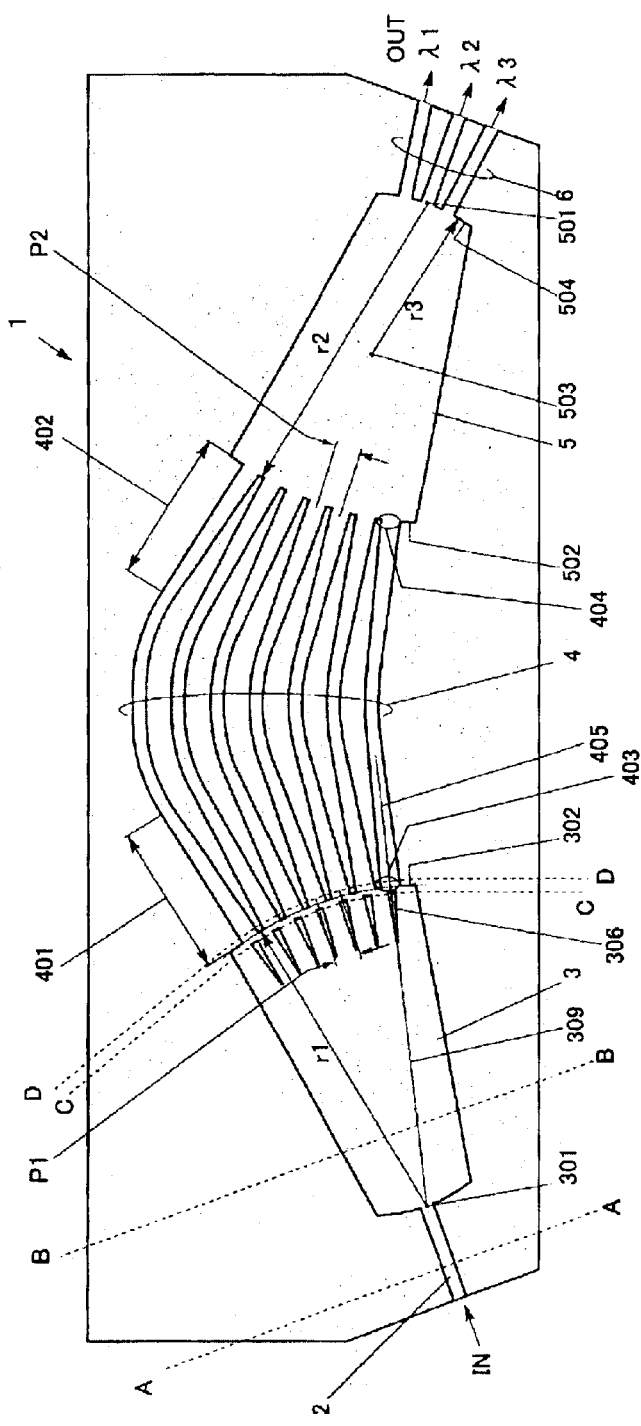

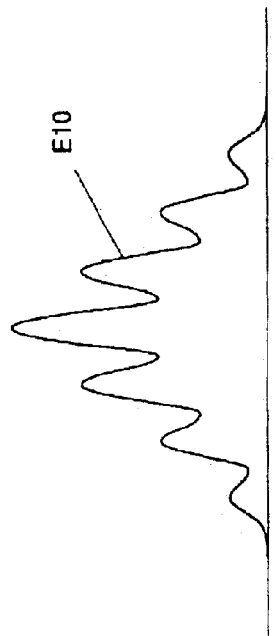
FIG. 16(a)
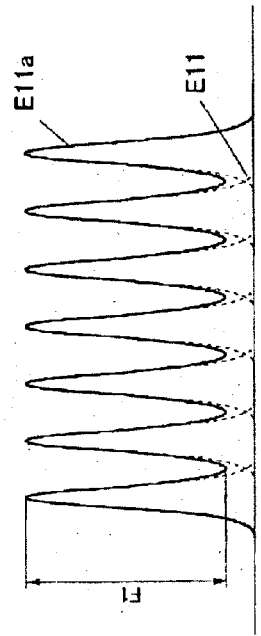
FIG. 16(b)
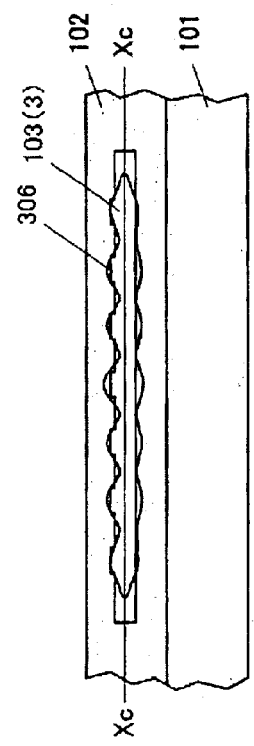
FIG. 16(c)
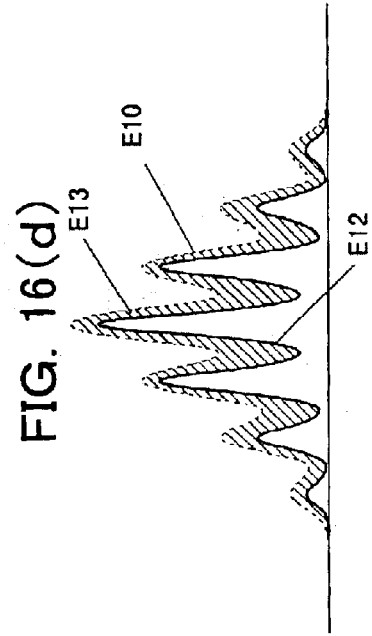
FIG. 16(d)
FIG. 16(e)
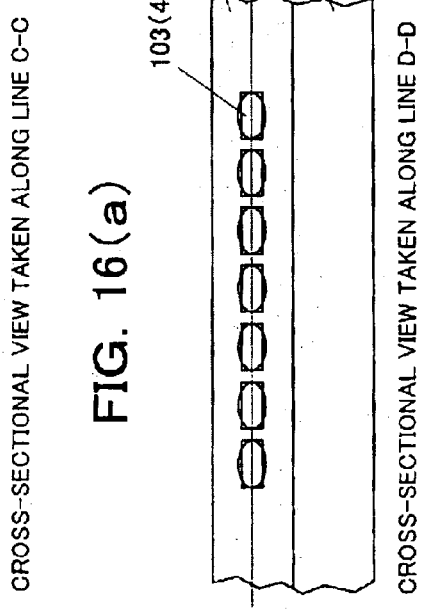

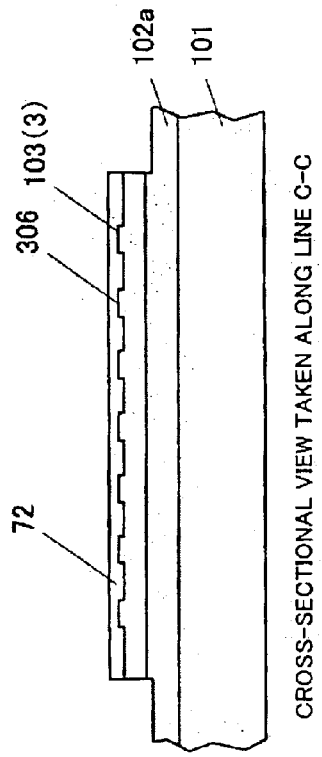
FIG. 17(c)
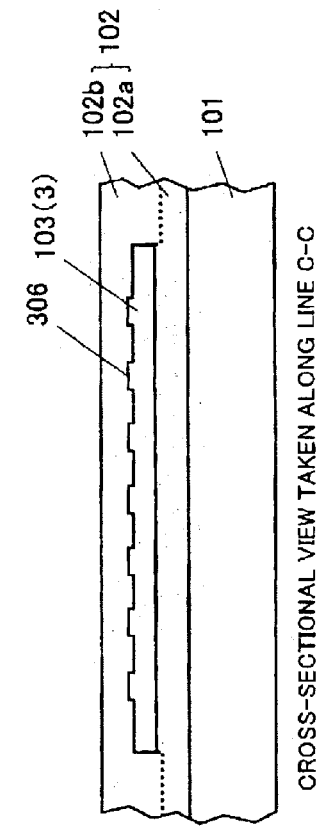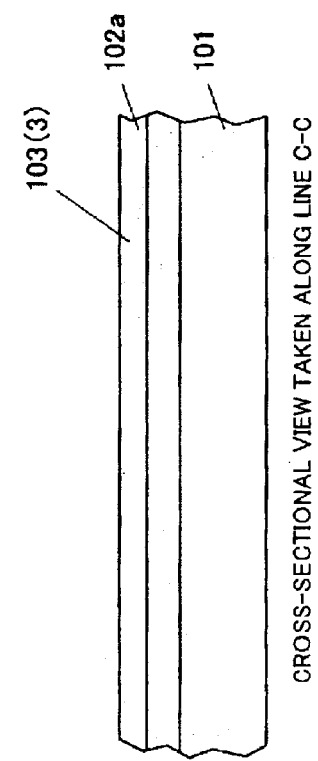
FIG. 17(a)
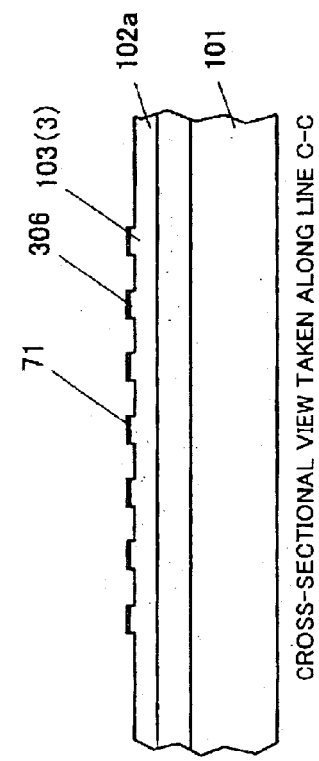
FIG. 17(d)
FIG. 17(b)

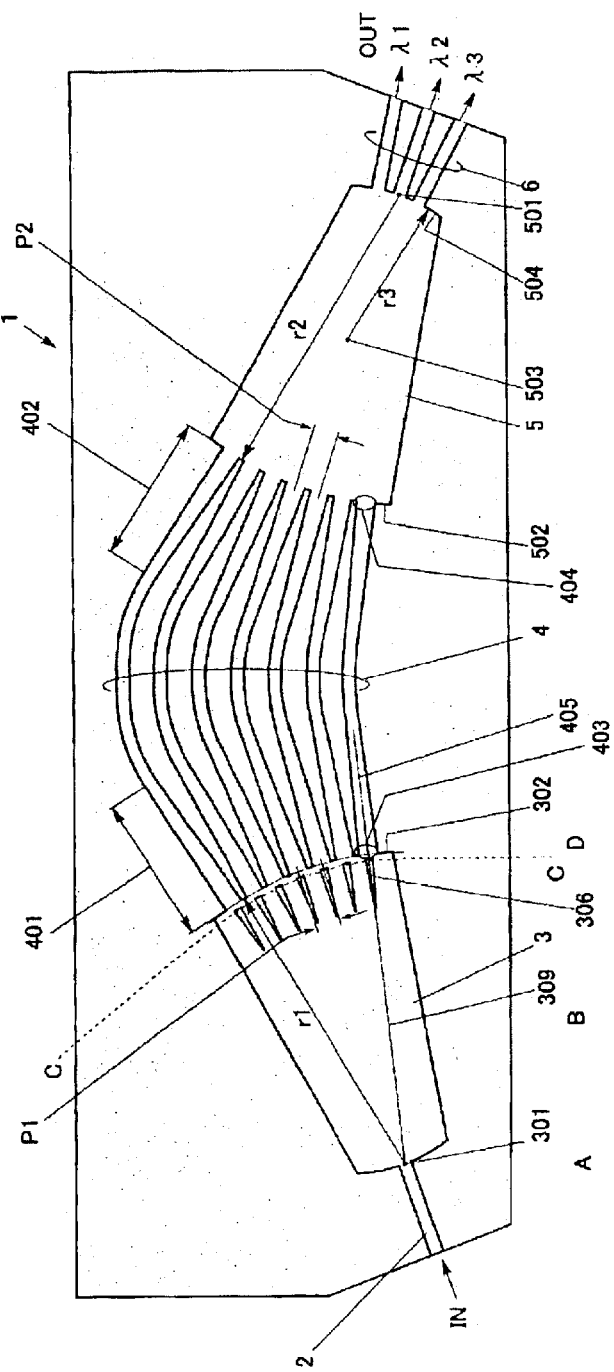
FIG. 18(a)
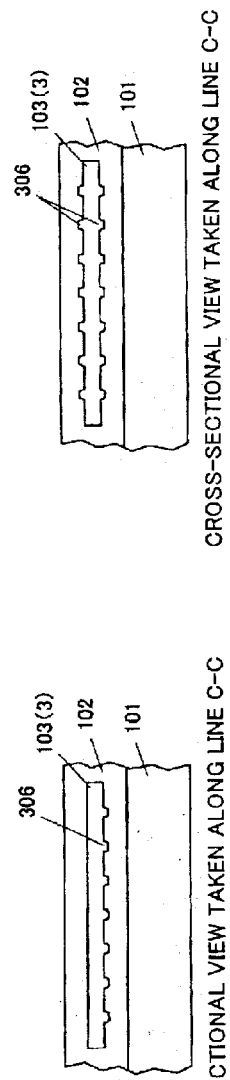
FIG. 18(b)
CROSS-SECTIONAL VIEW TAKEN ALONG LINE C-C
FIG. 18(c)
CROSS-SECTIONAL VIEW TAKEN ALONG LINE C-C

CROSS-SECTIONAL VIEW TAKEN ALONG LINE D-D

CROSS-SECTIONAL VIEW TAKEN ALONG LINE B-B

CROSS-SECTIONAL VIEW TAKEN ALONG LINE A-A

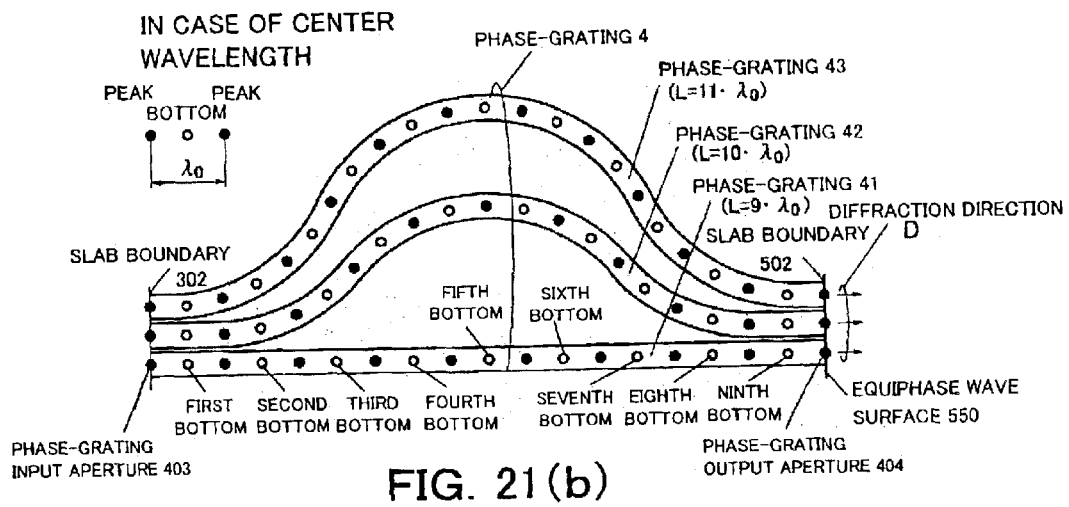
FIG. 21(a)
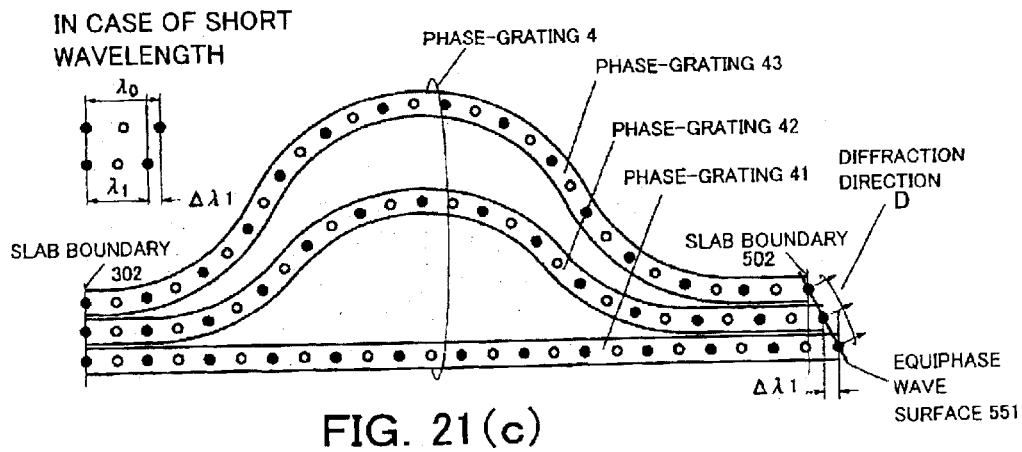
FIG. 21(b)
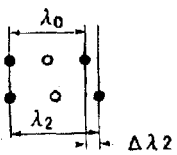
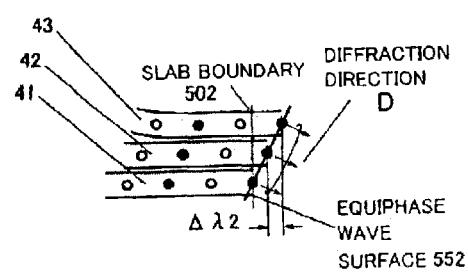
FIG. 21(c)

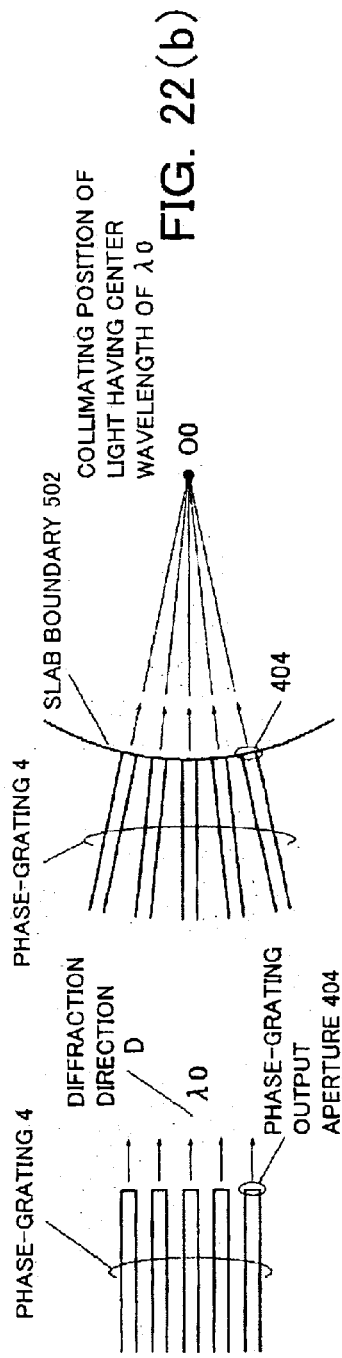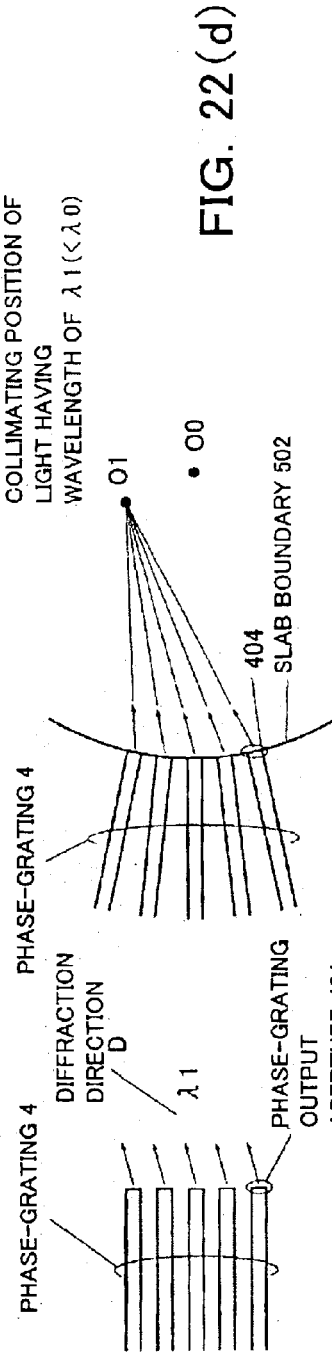

ARRAYED WAVEGUIDE GRATING TYPE WAVELENGTH DIVISION DEMULTIPLEXER

BACKGROUND OF THE INVENTION (1) Field of the Invention

The present invention relates to a wavelength division demultiplexer for use in a WDM (Wavelength Division Multiplex) communication in which a plurality of optical signal channels having respectively differing wavelengths are subjected to multiplexing so that the resulting optical signal can be transmitted through a single optical fiber and the transmitted optical signal is subjected to a step of dividing (demultiplexing) into separated optical signals having the respectively differing wavelengths. In particular, the present invention relates to an arrayed waveguide grating type wavelength division demultiplexer employing an array of optical waveguides which is comprised of a substrate, a cladding layer provided on the substrate, and a core layer surrounded with the cladding layer and having a refractive index higher than that of the cladding layer.

(2) Description of Related Art

FIGS. 20(a) to 20(d) shows an arrangement of a conventional arrayed waveguide grating type wavelength division multiplexer/demultiplexer employing a conventional AWG (Arrayed Waveguide Grating) optical signal transmission path. FIG. 20(a) is a plan view of the wavelength division multiplexer/demultiplexer, FIG. 20(b), FIG. 20(c) and FIG. 20(d) a cross-sectional view of the wavelength division multiplexer/demultiplexer taken along the line A—A, a cross-sectional view of the wavelength division demultiplexer taken along the line B—B, and a cross-sectional view of the wavelength division multiplexer/demultiplexer taken along the line D—D, respectively.

As shown in FIG. 20(b), the optical signal transmission path of the wavelength division multiplexer/demultiplexer is formed of a substrate 101, a cladding layer (hereinafter simply referred to as "cladding") 102 formed on the substrate 101 and a core layer (hereinafter simply referred to as "core") 103. The core 103 has a refractive index higher than that of the cladding 102. Moreover, the core 103 is surrounded with the cladding 102.

In FIG. 20(a), components identified by reference numerals 2, 3, 4, 5 and 6 are all patterns (core patterns) formed in the core 103. Of these components, a pattern 2 functions as an input waveguide, a pattern 3 an input slab waveguide (hereinafter simply referred to as "input slab"), a pattern 4 a phase-grating waveguide (arrayed optical channel waveguides), a pattern 5 an output slab waveguide (hereinafter simply referred to as "output slab"), and a pattern 6 an output waveguide.

Further, in FIG. 20(b), reference t represents a thickness of the core 103 constituting the input waveguide 2, and w2 a width of the core 103 constituting the input waveguide 2. Further, in FIGS. 20(a) and 20(d), reference P1 represents an interval of the array of the optical channel waveguides on the side of the input slab 3, w4 a width of the core 103 constituting the phase-grating waveguide array 4, and P2 an interval of the array of the optical channel waveguides on the side of output slab 5, respectively.

In addition, in FIG. 20(a), reference numeral 403 represents an input aperture of the phase-grating waveguide array 4. This input aperture also serves as a node of wave propagated through the waveguide. Reference numeral 404 represents an output input aperture of the phase-grating waveguide array 4 and this output aperture also serves as a node of wave propagated through the waveguide. Reference numeral 301 represents a coupling portion (hereinafter referred to as "coupling point") between the input waveguide 2 and the input slab 3. Reference numeral 302 represents a boundary surface between the input slab 3 and the phase-grating waveguide array 4. Reference numeral 502 represents a boundary surface of the output slab 5 and the phase-grating waveguide array 4. Reference numeral 504 represents a boundary surface of the output slab 5 and the output waveguide 6. Reference numeral 501 represents the geometrical center of the boundary surface 502. And reference numeral 503 represents the geometrical center of the boundary surface 504.

In this case, the boundary surface 302 is an arc-shape boundary surface with the center at the coupling point 301 and a radius of r1. The boundary surface 502 is an arc-shape boundary surface with the center at the coupling point 501 and a radius of r2. Further, the relationship between the radius r1 and the radius r2 is determined such that r1=r2. That is, the array of input apertures 403 of the phase-grating waveguide array 4 and the array of the output apertures 404 are disposed on arcs 302 and 502 having the diameters equal to each other. Further, a pitch P1 of the array of optical channel waveguides on the side of the input slab 3 and a pitch P2 of the array of optical channel waveguides on the side of the output slab 5 are also equal to each other.

Further, reference numeral 504a represents a circle having the geometrical center 503 and a radius equal to half the radius r2. This circle 504a is known as a Rowland circle of the circle which determines the distribution of the array of output apertures 404 of the phase-grating waveguide array 4 (circle having a radius of r2). The boundary surface 504 is formed of an arc which is taken away from a part of the circle 504a, i.e., the Rowland circle of the arc 502. The output waveguides 6 are disposed on the Rowland circle 504a. The wavelength of the light beam generated from any of the output waveguides 6 will differ depending on the location of the output waveguide 6 on the Rowland circle 504a.

As shown in FIG. 20(a), the phase-grating waveguide array 4 is composed of an array of a plurality of optical channel waveguides. Each of the optical channel waveguides is gradually elongated as the location of the optical channel waveguides shifts from the lower side to the upper side. Further, each of the optical channel waveguides is made to have a constant difference with respect to its adjacent optical channel waveguides in the optical path length between the end of the input slab 3-side and the end of the output slab 5-side on the core pattern.

The wavelength division multiplexer/demultiplexer is arranged as described above. If, for example, the wavelength division multiplexer/demultiplexer is applied with a bundle of light beams having undergone multiplexing of light beams with wavelengths, $\lambda 1$, $\lambda 2$, $\lambda 3$ (in the wavelength domain) at the input waveguide 2, then the bundle of light beams will be divided into individual light beams with wavelengths, $\lambda 1$, $\lambda 2$, $\lambda 3$ (in the wavelength domain) and generated from the respective output ports of the output waveguides 6. Conversely, if light beams with wavelengths, $\lambda 1$, $\lambda 2$, $\lambda 3$ are applied to the wavelength division multiplexer/demultiplexer at the plurality of the output ports of the output waveguides 6, respectively, then these light beams with wavelengths, $\lambda 1$, $\lambda 2$, $\lambda 3$ will be bound together (i.e., multiplexed in the wavelength domain) and the resulting light beam bundle will be generated at the input waveguide 2.

The following is detail description on the operation of the wavelength division multiplexer/demultiplexer.

That is, when a bundle of light beams is applied to the left end of the input waveguide 2, the light will be led through the input waveguide 2 and reach the coupling point 301 between the input waveguide 2 and the input slab 3. The light beam reaching the coupling point 301 will be no longer enclosed in the major surface direction of the substrate 2 (i.e., the direction of the plane of the sheet of FIG. 20(*a*)). Therefore, the light will be freely propagated through the input slab 3 with the propagation direction thereof expanded (dispersed). For this reason, the input slab 3 is sometimes referred to as "free propagation portion 3". Further, the coupling portion 301 between the input waveguide 2 and the input slab 3 is referred to as "dispersion center 301 of light" or in more simple notation, "dispersion center 301".

The bundle of light beams dispersed from the dispersion center 301 is led to each of the input apertures 403 of the phase-grating waveguide array 4, and enters into the phase-grating waveguide array 4. At this time, since the respective apertures 403 of the phase-grating waveguide array 4 are disposed on points equally distant from the dispersion center 301, the respective light beams incident on the apertures will have phases equal to one another.

Now operation of the phase-grating waveguide array 4 will be described with reference to FIGS. 21(*a*) to 21(*c*). FIGS. 21(*a*) and 21(*b*) show three neighboring optical channel waveguides 41, 42, 43 taken out from the plurality of optical channel waveguides of the phase-grating waveguide array 4 which constitutes the wavelength division multiplexer/demultiplexer shown in FIGS. 20(*a*) to 20(*d*). Further, FIG. 21(*c*) shows a state of a vicinity of the boundary surface between the phase-grating waveguide array 4 and the output slab 5.

As shown in FIGS. 21(*a*) to 21(*c*), the input aperture 403 of the phase-grating waveguide array 4 corresponds to the boundary surface (hereinafter also referred to as "boundary line") 302 between the input slab 3 and the phase-grating waveguide array 4. Further, the output aperture 404 of the phase-grating waveguide array 4 corresponds to the boundary surface 502 between the output slab 5 and the phase-grating waveguide array 4.

Further, as shown in FIGS. 21(*a*) to 21(*c*), each of the optical channel waveguides of the phase-grating waveguide array 4 has a series of marks of solid circles and empty circles alternately plotted along the channel. The solid circle represents a position at which the phase of the optical signal takes an even-times the ratio of the circumference of a circle to its diameter, or $\pi$, if the light beam is expressed as a sine wave function. Further, the empty circle represents a position at which the phase of the same optical signal takes a phase shifted by $\pi$ with respect to the phase of the solid circle. For example, FIG. 21(*a*) illustrates a state of phases taken in the optical signal channels when the incident light beam has the center wavelength $\lambda 0$ which is allowed for upon designing the wavelength division multiplexer/demultiplexer (i.e., a wavelength region expected to be utilized in the WDM communication). FIG. 21(*b*) illustrates a state of phases taken in the optical channel waveguides when the incident light beam has a wavelength $\lambda 1$ which is shorter than the center wavelength $\lambda 0$. And FIG. 21(*c*) illustrates a state of phases when the incident light beam has a wavelength $\lambda 2$ which is longer than the center wavelength $\lambda 0$.

As described above, the phase-grating waveguide array 4 is applied at its array of input apertures 403 with beams of incident light having an equal phase. Therefore, the beams of incident light will have an equal phase at the array of input apertures 403 of the phase-grating waveguide array 4 [see the solid circles at the input apertures 403 of FIGS. 21(*a*) and 21(*b*) In FIG. 21(*c*), the corresponding state is not illustrated]. In this case, each of the optical signal channels of the phase-grating wavelength array 4 is designed to have a length exactly integer multiple of the center wavelength $\lambda 0$.

For example, in the case of FIG. 21(*a*), the optical signal channel 41 of the phase-grating wavelength array 4 is designed to contain nine times the wavelength, the optical signal channel 42 of the same is designed to contain ten times the wavelength, and the optical signal channel 43 of the same is designed to contain 11 times the wavelength, respectively. In this case, the beams of incident light have an equal phase at the array of output apertures 404 of the optical signal transmitting channels 41, 42, 43 of the phase-grating waveguide array 4. Thus, an equiphase wave surface 550 becomes exactly perpendicular to the phase-grating waveguide array 4. Accordingly, the bundle of light beams at the output apertures 404 is diffracted accurately in the horizontal direction (i.e., direction parallel to the direction of the phase-grating waveguide array 4).

On the other hand, if the phase-grating waveguide array 4 (hereinafter sometimes simply referred to as "phase grating") is applied with beams of incident light having the wavelength of $\lambda 1$ which is shorter than the center wavelength $\lambda 0$ by $\Delta\lambda 1$, as shown in FIG. 21(*b*), an equiphase wave surface 551 created at the array of the output apertures 404 of the phase-grating waveguide array 4 tilts in the left direction. With this tilting, the light beams emitted from the array of the output apertures 404 of the phase grating 4 to the output slab 5 is diffracted in the upward direction.

Conversely, if the phase grating 4 is applied with beams of incident light having the wavelength of $\lambda 2$ which is longer than the center wavelength $\lambda 0$ by $\Delta\lambda 2$, as shown in FIG. 21(*c*), an equiphase wave surface 552 created at the array of the output apertures 404 of the phase grating 4 tilts in the right direction. With this tilting, the light beams emitted from the array of the output apertures 404 of the phase grating 4 to the output slab 5 is diffracted in the downward direction.

FIGS. 22(*a*) to 22(*f*) are diagrams each showing a state of light beam focusing in the output slab 5 effected on the bundle of light beams diffracted at the output apertures 404 as described above. FIGS. 22(*a*), 22(*c*), and 22(*e*) illustrate a manner of diffraction of which direction is different from one another due to the difference in the wavelength, similarly to FIGS. 21(*a*), 21(*b*), and 21(*c*), respectively. That is, if the output apertures 404 of the phase grating 4 are arrayed straight, diffraction is effected to direct the light beams in the illustrated direction, with the result that the diffracted light beams become a parallel light beams.

However, in the actual wavelength division multiplexer/demultiplexer, the output apertures 404 of the phase grating 4 are disposed on an arc as shown in FIGS. 22(*b*), 22(*d*), and 22(*f*). Therefore, the diffracted light beams are focused on an identical point. In more detail, if the light beams transmitted through the phase grating 4 have a wavelength equal to the center wavelength $\lambda 0$, as shown in FIG. 22(*a*), the rays of light are focused at the center (O0) of the arc on which the output apertures 404 of the phase grating 4 are disposed. If the rays of light have a wavelength $\lambda 1$ which is shorter than the center wavelength $\lambda 0$, as shown in FIG. 22(*d*), the light beams are focused at the center (O1) which is located somewhat upward position with respect to the position of the center (O0). On the other hand, if the light beams have a wavelength λ2 which is longer than the center wavelength λ0, as shown in FIG. 22(f), the rays of light are focused at the center (O2) which is located somewhat downward position with respect to the position of the center (O0).

In any of the above cases, the focusing position is located on the Rowland circle 504a of the arc on which the output apertures 404 of the phase grating are disposed. For this reason, as shown in FIG. 20(a), if one end of the output waveguide 6 is disposed on the Rowland circle 504a, a light beam can be separated from the rays of light depending on the differing wavelength and the light beams can be generated from the wavelength division multiplexer/demultiplexer.

Now description will be made on one of the causes of insertion loss brought about in the subject wavelength division multiplexer/demultiplexer. In the wavelength division multiplexer/demultiplexer having the above-described construction, as shown in FIGS. 23(a), 23(b), and 23(c), there are provided gaps G at the coupling portions between the phase-grating 4 and the output slab 5. These gaps G can cause a loss in the light beams which are incident on the input waveguide 3, propagate from the input waveguide 3 through the input slab 3 and are coupled to the phase-grating 4.

In FIG. 23(c), for example, reference numeral 801 represents a component of the light beams incident on the phase-grating 4 and 802 a component becoming the loss due to the dispersion brought about at the gap G. In order to reduce the loss component 802, it is desirable to made small the gap G as far as possible. On the other hand, in the phase grating 4, it is necessary to cause a phase difference among the light beams traveling the respective optical channel waveguides. Therefore, it is necessary to avoid interference among the light beams traveling the respective optical channel waveguides.

To this end, the phase-grating waveguide array 4 should be arranged in such a manner that each of the optical channel waveguides is disposed apart from the neighboring one by a predetermined interval or more in the whole region of the phase-grating waveguide array 4 except for the nodes 403 on the side of the input slab 3. In a conventional manner, the interval P1 between the optical channel waveguides of the phase-grating 4 at the nodes 403 is kept constant, so that portions of the phase-grating 4 other than the node portions come to have a regular interval.

One of schemes for making the gap G small while the interval P1 between the neighboring optical channel waveguides of the phase grating waveguide array 4 is kept in a predetermined value or more is as follows. That is, as shown in FIG. 23(a), each of the optical channel waveguides of the phase-grating waveguide array 4 is formed to have a tapered portion 401 at the coupling portion between the input slab 3 and the phase-grating waveguide array 4. Each of the optical channel waveguides is also formed to have a tapered portion 402 at the coupling portion between the phase-grating waveguide array 4 and the output slab 5. As described above, the conventional wavelength division multiplexer/demultiplexer is arranged to have the tapered portions 401 and 402 so that the size of the gap G can be decreased while the interval P1 of the waveguide channels is kept in a predetermined value or more. Thus, the optical coupling loss can be decreased at the coupling portion between the input slab 3 and the phase-grating waveguide array 4 and the coupling portion of the phase-grating waveguide array 4 and the output slab 5.

In FIG. 20(b), reference t represents the thickness of the core. In this example, the core is made to have a constant thickness over the whole area including the input waveguide 2, the input slab 3, the phase-grating waveguide array 4, the output slab 5 and the output waveguide 6. For example, if the core is made to have a thickness of 7 μm and the waveguide channels are formed thereon, the interval P1 of the phase-grating waveguide array 4 on the side of input slab 3 is requested to have a dimension of 18 μm or more. However, the steps of fabricating the device encounters such a limitation that a certain width of a photomask shall be allowed for the step of fabrication and overetching in the lateral direction shall be also allowed for the step of fabrication. For this reason, it is difficult to form gaps G of 3 μm or less. Therefore, even if the tapered portions 410 and 402 are formed, optical coupling loss of 1 dB (decibel) or more can be caused at the coupling portion between the input slab 3 and the phase-grating waveguide array 4. Further, if the gap G is made small, it becomes more difficult to completely fill the cladding material into the gap between a pair of the optical channel waveguides adjacent to each other.

One of the conventional countermeasure has been proposed in Japanese Patent Laid-open Gazette No. 2002-62444 (hereinafter referred to as a publication document). According to this publication document, the mode profile at the output portion of the input slab is shaped into a mode profile at the input portion of the phase-grating waveguide array 4, whereby the light propagation property is made independent of the interval of the waveguide channels and the optical coupling loss is reduced.

In other words, according to the technology proposed in the publicly known document (herein after referred to as publicly known art), as shown in FIGS. 24(a) and 24(b), the input side slab waveguide 40 has provided at its output portion 40A a high refractive index varying region 60 of which refractive index is higher than surrounding portions thereof. According to the subject publicly known art, the refractive index varying region 60 is provided in the following manner. That is, dopant materials such as of Ge, Ge and P. Ge, B and the like are doped into the input side slab waveguide 40 (core), the device is applied with a mask for covering all portion thereof except for a portion at which the high refractive index varying region 60 shall be formed, and then the device is subjected to an ultraviolet laser ray exposure step such as of an ArF-excimer laser to vary the refractive index of the core exposed under the ultraviolet laser ray. Thus, the light beam propagating through the output portion 40A comes to have a mode profile (refractive index profile) which is substantially coincident with the mode profile of the phase-grating waveguide array 50.

With this arrangement, if light beams are incident on the input side slab waveguide 40 at the refractive index varying region 60, the light beams change their phases depending on the refractive index profile, and propagate through a phase-grating waveguide array 50 while the mode profiles of the light beams are substantially confirmed with a mode profile which is created depending on the layout of the array of optical channel waveguides of the phase-grating waveguide array 50. As a consequence, it becomes possible to make the light propagation property independent of the interval L2 [see FIG. 24(b)] of the optical channel waveguides of the phase-grating waveguide array 50 and reduce the optical coupling loss brought about at the coupling portion between the input side slab waveguide 40 and the phase-grating waveguide array 50. Moreover, the device can reliably secure a sufficient space for the gap G between each neighboring couple of the optical channel waveguides of the phase-grating waveguide array 50, so that the cladding material can be satisfactorily filled into the gap G, and the optical coupling loss brought about at the coupling portion can be reduced more reliably.

However, the above-described publicly known art encounters the following three problems, for example. A first problem is that if the core material is not doped with Ge, the above fabrication method cannot be applied. That is, frequently observed is a phenomenon that an ArF-laser excitation light beam (193 nm) or a KrF-laser excitation light beam (245 nm) is applied to cause variation in the refractive index, when the core material is doped with Ge, Ti or Ce. This observation has been reported in, for example, Japanese Patent Laid-open Gazette No. HEI 4-298702 at page 8 from line 1 to line 2.

Further, if the core material is doped with Ge and B or Ge and P at a time, the refractive index varying region 60 comes to have a remarkably improved sensitivity to the light beam irradiation in the refractive index. This observation has been also reported in Japanese Patent Laid-open Gazette No. 2000-155231 at paragraphs of [0003] to [0004] or a document of IEEE PHOTONICS TECHNOLOGY LETTERS, VOL. 7, NO.9, pp.1048–1050 (1995), for example. In other words, the material of B, P or the like serves as a sensitizer for enhancing the sensitivity in the refractive index variation of the glass doped with Ge for an ultraviolet ray's irradiation. However, the inventor of the present application confirmed that if a silica glass doped with B or P solely or doped with B and P at the same time fabricated by means of MOVPE method was placed under irradiation of ArF-laser excitation light (193 nm), no refractive index change was observed.

Accordingly, the above-described publicly known art cannot be applied to a case in which the input side slab waveguide is not doped at the core thereof with Ge, Ti or Ce. Furthermore, the inventor of the present application confirmed that if the device was tried to be fabricated while the conditions of the refractive index, coefficient of linear expansion, and crack preventing environment under fabrication were all satisfied, some cases were observed in which to dope the materials of Ge, Ti, Ce into the core not always resulted in satisfactory performance. Therefore, it follows that the above-described publicly known art cannot always endure a satisfactory result when it is applied to such a case.

A second problem that the above-described publicly known art will encounter is that the refractive index variation created by the ultraviolet ray's irradiation can be decayed or vanished. Observation of such phenomenon was reported in, for example, a document of "J. Appl. Phys. 76(1), pp. 73 (1994), a document of "1996 Electronics Society Conference Technical Report of the Institute of Electronics, Information and Communication Engineers (page 1–142, lecture number C-142), or the like. According to the report of the documents, if the device is reserved under a maximum temperature condition of 80° C. or more and the device was driven under a maximum temperature condition of 60° C. or more, the device can suffer from characteristic change with time passage. For this reason, there is a fear that the device cannot endure driving for a long period of time. In addition, since the refractive index can be changed with time passage, the light intensity profile can also change, with the result that the device insertion loss can be changed with time passage.

A third problem is that when the device is placed under the irradiation of the ultraviolet laser ray, the device comes to have a volume unbalance between a portion placed under the laser irradiation and a portion not placed under the laser irradiation. With this unbalance, the input side slab waveguide 40 (output portion 40A) comes to have an undesirable stress. This stress enlarges a PDL (Polarization Dependent Loss) in the output portion 40A. As a consequence, there is a fear that the characteristics of the wavelength division multiplexer/demultiplexer is deteriorated. The inventor of the present application confirmed that when the ultraviolet laser beam is irradiated onto the device to change the refractive index of the core of the input side slab waveguide 40, the PDL was increased as the refractive index is increased.

SUMMARY OF THE INVENTION

The present invention is made in view of the above aspect. Therefore, it is an object of the present invention to provide an arrayed waveguide grating type wavelength division demultiplexer which can perform wavelength division demultiplexing without exploiting a refractive index variation caused by an ultraviolet laser beam irradiation (onto a core layer which has no materials of Ge, Ti, Ce doped therein), which is free from reflux index property change due to time passage, and moreover, and which makes it possible to decrease the polarization dependent loss to further decrease an optical coupling loss brought about in the device.

According to the present invention, in order to attain the above object, there is provided an arrayed waveguide grating type wavelength division demultiplexer having a waveguide grating array which is composed of a substrate, a cladding layer provided on the substrate and a core layer provided in the cladding layer so as to form a predetermined pattern, including an input waveguide for propagating a plurality of input light beams having respective wavelength, each beam being associated with one of a plurality of optical channel waveguides, an input slab waveguide for allowing free propagation of the light beams from the input waveguide, a phase-grating waveguide array composed of a plurality of optical channel waveguides for propagating the light beams from the input slab waveguide, each of the optical channel waveguides having a waveguide length different from one another by a predetermined length, an output slab waveguide for allowing a free propagation of the light beams from the plurality of optical channel waveguides of the phase-grating waveguide array, and focusing the light beams at a different position depending on the wavelength of the light beams, and a plurality of output waveguides for propagating the light beams focused by the output slab waveguide, respectively, wherein the input waveguide, the input slab waveguide, the phase-grating waveguide array, the output slab waveguide, and the plurality of output waveguides are provided in the core layer so as to form the predetermined pattern, and the input slab waveguide is configured to have portions with locally varied thickness in at least one of the core layer and the cladding layer at the vicinity of each coupling portion of the optical channel waveguide depending on the layout of the optical channel waveguides, whereby the input slab waveguide is made to have a high refractive index region having a refractive index relatively higher than surrounding regions thereof at the vicinity of each coupling portion of the optical channel waveguide.

In this case, the portions with locally varied thickness of the input slab waveguide may be composed of an array of concave portions provided on the core layer at the vicinity of each coupling portion of the optical channel waveguide, whereby the input slab waveguide is made to have the high refractive index regions each having a refractive index relatively higher than surrounding regions thereof at the vicinity of each coupling portion of the optical channel waveguide. Further, the portions with locally varied thickness of the input slab waveguide may be composed of an array of concave portions provided on the cladding layer at the vicinity of each coupling portion of the optical channel waveguide, whereby the input slab waveguide is made to have the high refractive index regions each having a refractive index relatively higher than surrounding regions thereof at the vicinity of each coupling portion of the optical channel waveguide.

As to the portions with locally varied thickness of the input slab waveguide, it is desirable for each of the concave portions to have a wedge shape of which width is gradually expanded toward the optical channel waveguide.

Meanwhile, the portions with locally varied thickness of the input slab waveguide may be composed of an array of convex portions provided on the core layer at the vicinity of each coupling portion of the optical channel waveguide, whereby the input slab waveguide is made to have the high refractive index regions each having a refractive index relatively higher than surrounding regions thereof at the vicinity of each coupling portion of the optical channel waveguide.

According to the arrayed waveguide grating type wavelength division demultiplexer of the present invention, the following effects or advantages can be obtained.

(1) The input slab waveguide is configured to have the portions with locally varied thickness (i.e., to provide concave portions or convex portions) in at least one of the core layer and the cladding layer depending on the layout of the optical channel waveguides, whereby the input slab waveguide is made to have the high refractive index region at the vicinity of the optical channel waveguide. Therefore, light beams traveling from the input slab waveguide to the channel waveguide can be focused on the high refractive index region, led to the phase-grating waveguide array, and coupled to the phase-grating waveguide array. Accordingly, it becomes possible to remarkably reduce the optical coupling loss caused by the gap provided in the coupling portion between the input slab waveguide and the phase-grating waveguide array.

(2) In particular, according to the present invention, the high refractive index region provided in the input slab waveguide at the vicinity of each coupling portion of the optical channel waveguide is formed of the portions with locally varied thickness provided in at least one of the core layer and the cladding layer depending on the layout of the optical channel waveguides. Therefore, even if the wavelength division demultiplexer has the core layer or the cladding layer which has no materials of Ge, Ti, Ce doped therein, the present invention can be applied to the wavelength division demultiplexer. Moreover, the refractive index variation created based on the present invention can be free from property change due to time passage regardless of the surrounding temperature. Therefore, the device of the present invention can be made more durable and it becomes possible to remarkably decrease the insertion loss change of the present device due to time passage. Furthermore, it becomes possible to reliably suppress the polarization dependent loss caused by the volume change brought about in the core layer or the cladding layer due to the ultraviolet laser beam irradiation.

(3) Further, according to the present invention, each of the concave portions or the convex portions is made to have a wedge shape of which width is gradually expanded toward the optical channel waveguide (in the light beam propagating direction). Therefore, when the light beam is incident on the concave portion or the convex portion, the light beam can be prevented from light dispersed due to the concave portion or the convex portion itself. Accordingly, it becomes possible to more effectively decrease the optical coupling loss at the optical channel waveguide.

(4) Furthermore, according to the present invention, each of the concave portions or the convex portions is made to have a depth or height which is gradually increased toward the optical channel waveguide (i.e., the concave portions or the convex portions is made to have a wedge-shape cross-section taken along the light beam traveling direction of the optical channel waveguide). Therefore, the light beams directed from the input slab waveguide to the optical channel waveguide can be gradually focused and propagated in the high refractive index region toward the optical channel waveguide. Accordingly, it becomes possible to improve the optical coupling efficiency in the optical channel waveguide as compared with a case in which the depth of the concave portions or the height of the convex portions is made constant.

The above and other objects, features and advantages of the present invention will become apparent from the following description with reference to the accompanying drawings which illustrate examples of the present invention.

BRIEF DESCRIPTION OF THE DRAWINGS

FIG. 1(a) is a plan view showing an arrayed waveguide grating type wavelength division multiplexer/demultiplexer according to a first embodiment of the present invention;

FIG. 1(b) is a cross-sectional view taken along a line A—A in FIG. 1(a);

FIG. 1(c) is a cross-sectional view taken along a line B—B in FIG. 1(a);

FIG. 1(d) is a cross-sectional view taken along a line C—C in FIG. 1(a);

FIG. 1(e) is a cross-sectional view taken along a line D—D in FIG. 1(a);

FIGS. 4(a) to 4(e) are diagrams for explaining from a qualitative standpoint a cause of an optical coupling loss brought about in the ray of light propagating through the input slab waveguide and coupled to the phase-grating waveguide array;

FIGS. 5(a) to 5(c) are diagrams for explaining the (electric field) intensity profile of the ray of light propagating from the input slab waveguide to the phase-grating waveguide array of the arrayed waveguide grating type wavelength division multiplexer/demultiplexer as the first embodiment of the present invention;

FIGS. 6(a) to 6(e) are diagrams for explaining the (electric field) intensity profile and optical coupling condition of the ray of light propagating from the input slab waveguide to the phase-grating waveguide array of the arrayed waveguide grating type wavelength division multiplexer/demultiplexer as the first embodiment of the present invention;

FIG. 8(a) is a plan view showing an arrayed waveguide grating type wavelength division multiplexer/demultiplexer according to a second embodiment of the present invention;

FIG. 8(b) is a cross-sectional view taken along a line A—A in FIG. 8(a);

FIG. 8(c) is a cross-sectional view taken along a line B—B in FIG. 8(a);

FIG. 8(d) is a cross-sectional view taken along a line C—C in FIG. 8(a);

FIG. 8(e) is a cross-sectional view taken along a line D—D in FIG. 8(a);

FIGS. 10(a) to 10(e) are diagrams for explaining the light beam (electric field) intensity profile and optical coupling condition of the ray of light propagating from the input slab waveguide to the phase-grating waveguide array of the arrayed waveguide grating type wavelength division multiplexer/demultiplexer as the second embodiment of the present invention;

FIG. 12(a) is a plan view showing an arrayed waveguide grating type wavelength division multiplexer/demultiplexer according to a first modification of the second embodiment of the present invention;

FIG. 12(b) is a cross-sectional view taken along a line A—A in FIG. 12(a);

FIG. 12(c) is a cross-sectional view taken along a line B—B in FIG. 12(a);

FIG. 12(d) is a cross-sectional view taken along a line C—C in FIG. 12(a);

FIG. 12(e) is a cross-sectional view taken along a line D—D in FIG. 12(a);

FIG. 13(a) is a plan view showing an arrayed waveguide grating type wavelength division multiplexer/demultiplexer according to a second modification of the second embodiment of the present invention;

FIG. 13(b) is a cross-sectional view taken along a line A—A in FIG. 13(a);

FIG. 13(c) is a cross-sectional view taken along a line B—B in FIG. 13(a);

FIG. 13(d) is a cross-sectional view taken along a line C—C in FIG. 13(a);

FIG. 13(e) is a cross-sectional view taken along a line D—D in. FIG. 13(a);

FIG. 14(a) is a plan view showing an arrayed waveguide grating type wavelength division multiplexer/demultiplexer according to a third embodiment of the present invention;

FIG. 14(b) is a cross-sectional view taken along a line A—A in FIG. 14(a);

FIG. 14(c) is a cross-sectional view taken along a line B—B in FIG. 14(a);

FIG. 14(d) is a cross-sectional view taken along a line C—C in FIG. 14(a);

FIG. 14(e) is a cross-sectional view taken along a line D—D in FIG. 14(a);

FIGS. 16(a) to 16(e) are diagrams for explaining the (electric field) intensity profile and optical coupling condition of the ray of light propagating from the input slab waveguide to the phase-grating waveguide array of the arrayed waveguide grating type wavelength division multiplexer/demultiplexer as the third embodiment of the present invention;

FIGS. 17(a) to 17(d) are diagrams for explaining steps of forming an array of convex portions on (the core layer of) the input slab of the arrayed waveguide grating type wavelength division multiplexer/demultiplexer as the third embodiment of the present invention;

FIGS. 18(a) to 18(c) are diagrams for explaining an arrayed waveguide grating type wavelength division multiplexer/demultiplexer according to a first modification of the third embodiment of the present invention;

FIGS. 21(a) to 21(c) are diagrams for explaining a spectroscopic principle of a conventional wavelength division multiplexer/demultiplexer;

FIGS. 22(a) to 22(f) are diagrams for explaining a focusing action at an output slab of the conventional wavelength division multiplexer/demultiplexer;

DESCRIPTION OF THE PREFERRED EMBODIMENTS

Figure 2A:
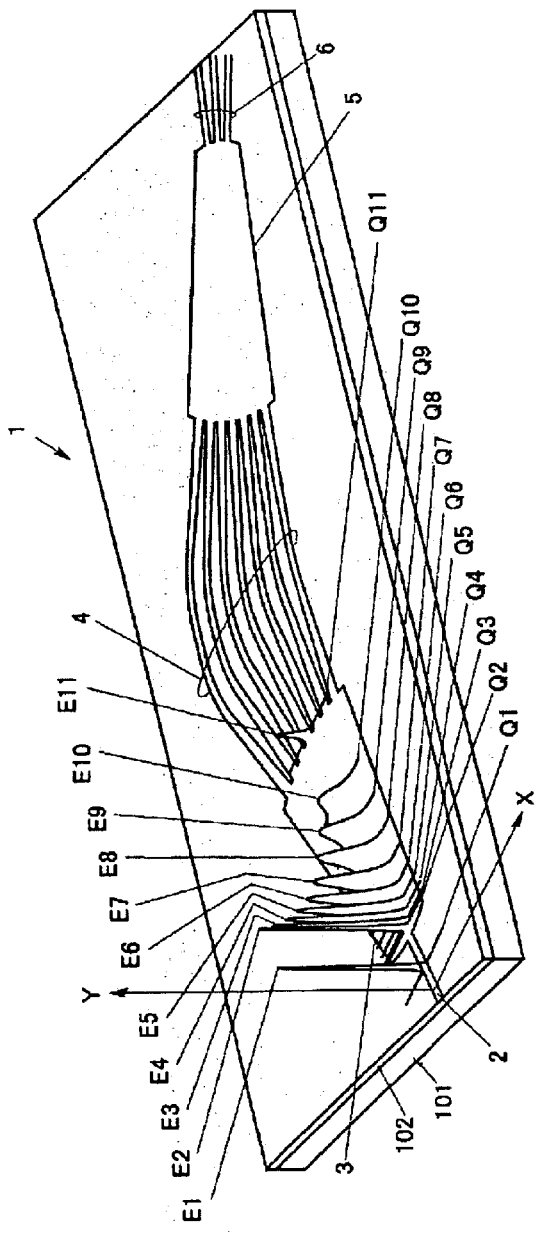
FIGS. 2(a) and 2(b) are diagrams each showing an example of intensity profile of light (electric field) propagating through an input waveguide and an input slab waveguide of the arrayed waveguide grating type wavelength division multiplexer/demultiplexer.

Embodiments of the present invention will be hereinafter described with reference to the drawings.

(A) Description of First Embodiment (A1) Description of Arrangement and Operation FIGS. 1(a) to 1(e) are diagrams for explaining a first embodiment of the present invention. FIG. 1(a) is a plan view showing an arrayed waveguide grating type wavelength division multiplexer/demultiplexer according to the first embodiment of the present invention, FIG. 1(b) a cross-sectional view taken along a line A—A in FIG. 1(a), FIG. 1(c) a cross-sectional view taken along a line B—B in FIG. 1(a), FIG. 1(d) a cross-sectional view taken along a line C—C in FIG. 1(a), and FIG. 1(e) a cross-sectional view taken along a line D—D in FIG. 1(a).

As shown in FIG. 1(a), the arrayed waveguide grating type wavelength division multiplexer/demultiplexer 1 of the present embodiment is also arranged to include an input waveguide 2, an input slab waveguide (hereinafter sometimes simply referred to as "input slab") 3, a phase-grating waveguide array (hereinafter sometimes simply referred to as "phase grating") 4, an output slab waveguide (hereinafter sometimes simply referred to as "output slab") 5, and an output waveguide 6. As shown in FIGS. 1(b) to 1(e), these components are formed in a cladding layer 102 and a core layer 103 made of silica glass deposited on a silicon substrate 101.

According to the arrangement of the present embodiment, the core layer (hereinafter simply referred to as "core") 103 and the cladding layer (hereinafter simply referred to as "cladding") 102 are made to have refractive indices of which ratio of relative difference is 0.5%. The core 103 is made to have a thickness t [see FIG. 1(b)] of 7 μm (micrometer), and the cladding 102 is made to have a thickness of 20 μm including the core 103 which is interposed between the upper portion of the cladding and the lower portion of the same. Further, the core 103 is made to have the thickness which is constant over the whole area of the layer except for an array of concave portions 304 each having a wedge shape which will be more fully described. The input waveguide 2, the output waveguide 6 and each optical channel of the phase-grating waveguide array 4 are made to have a core width of 7 μm except for the tapered portions 401 and 402.

Further, the input slab 3 has an arc-shaped periphery contacted to the phase-grating 4 and an radius r1 of the arc-shaped periphery is set to 40 mm (millimeter). As shown in FIGS. 1(a) and 1(e), the phase-grating waveguide array 4 is composed of a plurality of optical channel waveguides arrayed at a regular interval (pitch) P1. The regular interval P1 of the optical channel waveguides is set to 20 μm on the side of the input slab 3. As shown in FIG. 1(e), a gap G is interposed between each adjacent optical channel waveguides of the phase-grating waveguide array 4, and this gap G is set to 3.5 μm. As shown in FIG. 1(a), the output slab 5 has an arc-shaped periphery contacted to the phase grating 4 and an radius r2 of the arc-shaped periphery is set to 40 mm. Also as shown in FIG. 1(a), a regular interval P2 of the optical channel waveguides of the phase-grating waveguide array 4 is set to 20 μm on the side of the output slab 5, and a gap interposed between each adjacent optical channel waveguides on the side of the output slab 5 is set to 3.5 μm.

In the present embodiment, as shown in FIGS. 1(a) and 1(d), the input slab 3 is configured to have a plurality of concave portions (concave, i.e., a portion at which the thickness t of the core is small) 304 on the surface of the core 103 constituting the input slab 3. The plurality of concave portions are provided at the vicinity of the phase grating 4 so that each concave portion has a wedge-shape of which width is gradually expanded toward the phase grating 4. In more concretely, for example, wedge-shaped concave portion 304 is configured to have a width of 4.5 μm at the end of phase grating-4 side, a width of 2 μm at the end of input waveguide-2 side, a length of 1 mm, and a depth of 3 μm. Meanwhile, as shown in FIG. 1(a), the array of concave portions 304 is provided in such a manner that a (geometrical) center line 307 between each pair of adjacent concave portions 304 provided on both the sides of the corresponding coupling portion of the optical channel waveguide overlaps at the extension 307 thereof extended toward the side of the phase-grating waveguide array 4 (in the light propagation direction) with a (geometrical) center line 405 of the corresponding optical channel waveguide.

Now an operation of the AWG wavelength division multiplexer/demultiplexer 1 of the present embodiment constructed as described above will be hereinafter described. In particular, an action or advantage deriving from the concave portions 304 will be described in detail.

Initially, a manner of optical beam propagation through the input waveguide 2, the input slab 3 and the phase-grating waveguide array 4 will be described.

FIG. 2 is a set of diagrams each showing an example of intensity profile of light (electric field) propagating through an input waveguide and an input slab waveguide of the AWG type wavelength division multiplexer/demultiplexer. Of these diagrams, FIG. 2(a) is a diagram schematically showing a change of intensity profile associated with the AWG type wavelength division multiplexer/demultiplexer 1. In FIG. 2(a), reference numerals Q1 to Q11 represent respective positions of the AWG type wavelength division multiplexer/demultiplexer 1 and reference numerals E1 to E11 represent light (electric field) intensity profile at respective positions Q1 to Q11. As shown in FIG. 2(a), an X-axis is set in one surface direction of the AWG type wavelength division multiplexer/demultiplexer 1, and a Y-axis is set in the surface direction, i.e., a direction perpendicular to X-axis. Thus, X-axis and Y-axis form a rectangular coordinate system. Accordingly, if a light beam is incident on the input waveguide 2, this light beam will be propagated in Z-axis direction which intersects with X-axis and Y-axis at a right angle (i.e., a direction in which the input waveguide 2 extends).

Figure 2B:
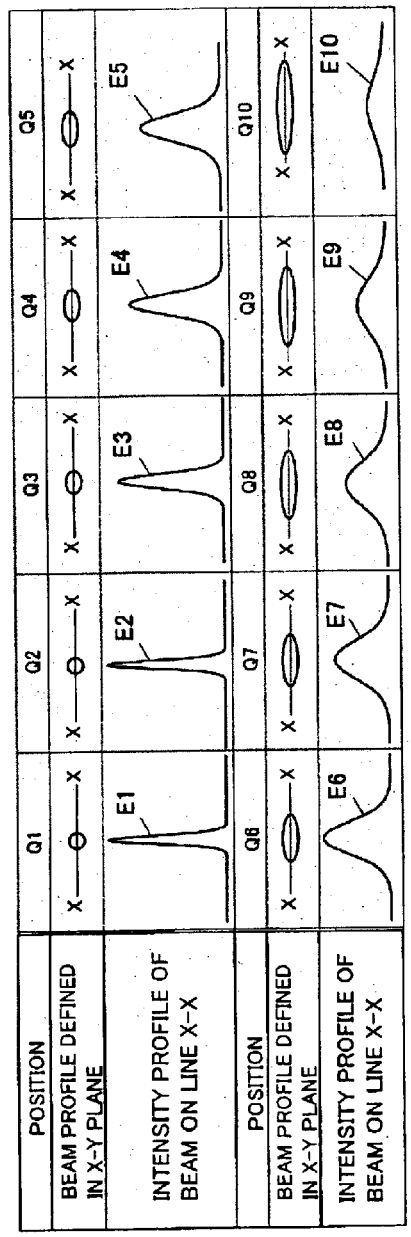

FIG. 2(b) is a table-like diagram composed of a plurality of squares, and diagrams entered in respective squares represent the light (electric field) intensity profile at the positions Q1 to Q10 shown in FIG. 2(a). In FIG. 2(b), terms of "beam profile defined in X-Y plane" means a beam profile of the light beam (electric field) as viewed in X-Y plane [Ordinarily, the beam profile is made up of a chart containing contour lines. However, the contour lines are not shown in FIG. 2(b)]. Terms of "intensity profile of beam on line X—X" means a cross-section of the diagram showing the beam profile defined in X-Y plane taken along the line X—X. This cross-section represents a light beam (electric field) intensity profile as viewed from the underside of the plane of the sheet of paper. (The intensity of the light beam will become stronger toward the center of the beam. Therefore, the intensity profile will become a curve having a peak at the center thereof as shown in FIG. 2(b).) As will be understood from FIGS. 2(a) and 2(b), the light beam (electric field) intensity profile exhibits, at the position Q1 in the input waveguide 2 and the position Q2 as a boundary portion (coupling portion) between the input waveguide 2 and the input slab 3, light beam (electric field) intensity profiles E1 and E2 each of which is made up of a curve having a sharp peak with a small width and a large height. When the light beam propagates through the input slab 3, the beam shape is widen owing to the diffraction and the beam is allowed a free propagation (diffusive propagation). For this reason, the light beam (electric field) intensity profile comes to have a curve having a peak with a gradually expanded width as the light beam reaches the positions of Q3, Q4, ..., Q10. Thus, the intensity profile of the light beam changes as those of E3, E4, ..., E10 at respective positions. In this way, the light beam is incident on the phase-grating waveguide array 4 and optical coupling with the phase-grating waveguide array 4 is accomplished.

A this time, if high similarity is obtained between the intensity profile E10 of the light beam (electric field) which propagates freely through the input slab 3 and the intensity profile E11 of the light beam (electric field) which is excited in the phase-grating waveguide array 4, optical coupling with high efficiency can be expected, correspondingly.

Figure 3:
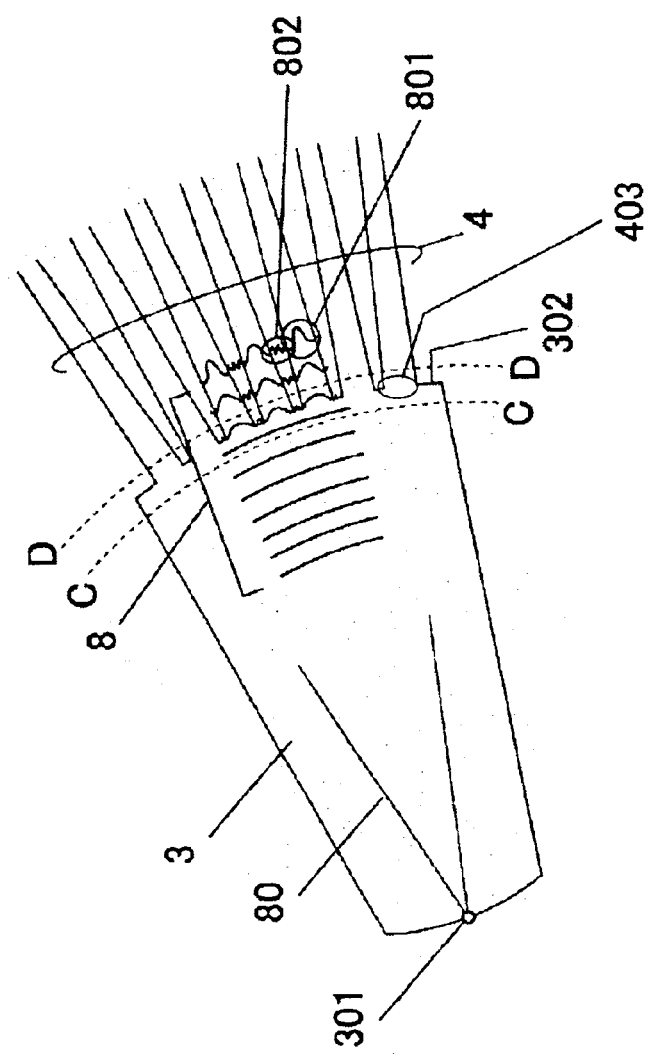
FIG. 3 is a diagram schematically showing an example of the electric field profile of a ray of light propagating from the input slab waveguide to an phase-grating waveguide array.

FIG. 3 is a diagram schematically showing an example of the electric field profile of a bundle of light beams propagating from an input slab 3 having no array of concave portions provided therein to an phase-grating waveguide array 4. In FIG. 3, reference numeral 301 represents a dispersion center of the ray of light, 80 a locus of the ray of light dispersed with the dispersion center 301 as a starting point, 8 a series of curves exhibiting the light (electric field) intensity profile of the light beam propagating through the input slab 3 to which reference is made for illustrating how the intensity profile is changed. Reference numerals 801 and 802 represent components of the ray of light outputted from the input slab 3. Of the ray of light outputted from the input slab 3, reference numeral 801 represents an intensity profile of a component which is successfully coupled to the phase-grating waveguide array 4, and 802 an intensity profile of a component which fails to be coupled to the phase-grating waveguide array 4 due to the gap G and becomes a loss. As shown in FIG. 3, if the input slab 3 is configured to have no concave portion 304, relatively large number of dispersion components 802 are generated.

Now qualitative description will be made by using a principle of superposition of electric fields on an optical loss brought about on a light beam which is propagated through the input slab 3 and coupled to the phase-grating waveguide array 4 with reference to FIGS. 4(a) to 4(e). Of these diagrams, FIG. 4(a) is a cross-sectional view taken along a line C—C in FIG. 1(a) and FIG. 3, FIG. 4(b) a diagram showing a light (electric field) intensity profile at a line Xc—Xc of FIG. 4(a), FIG. 4(c) a cross-sectional view taken along a line D—D in FIG. 1(a) and FIG. 3, and FIG. 4(d) a diagram showing a light (electric field) intensity profile at a line Xd—Xd of FIG. 4(c). Meanwhile, reference numeral E10 shown in FIG. 4(b) equals E10 shown in FIG. 2, and E11 shown in FIG. 4(d) equals E11 shown in FIG. 2.

In FIG. 4(d), reference numeral E11a represents a light (electric field) intensity profile created when a plurality of light beams (electric fields) propagating through the phase-grating waveguide array. 4 are superposed on one another. F1 a distance between a bottom and a peak of the superposed light (electric field) intensity profiles. Of the profiles of the light (electric field) intensity profile E10 of the input slab 3 and the light (electric field) intensity profile E11a of the phase-grating waveguide array 4, power of a portion at which the profiles E10 and E11a are superposed on one another is transferred to the phase-grating waveguide array 4.

As for example schematically shown in FIG. 4(e), if the light (electric field) intensity profile E10 of the input slab 3 and the light (electric field) intensity profile E11a of the phase-grating waveguide array 4 are superposed on one another, then electric field energy successfully coupled to the phase-grating waveguide array 4 comes to have a light intensity profile E12 shown in FIG. 4(e). Thus, electric field energy represented by a profile E13 becomes one which fails to be coupled to the phase-grating waveguide array 4 and results in a loss. Therefore, if the area of the profile E13 shown in FIG. 4(e) can be reduced, which fact means that the coupling loss between the input slab 3 and the phase-grating waveguide array 4 can be successfully reduced.

According to the arrangement of the present embodiment, as has been described with reference to FIG. 1, the input slab 3 is configured to have an array of concave portions (or thin portions) 304 on the core 103 constituting the input slab 3 (i.e., the core 103 is configured to have an array of portions with a locally varied thickness depending on the layout of the optical channel waveguides of the phase-grating waveguide array 4). With this configuration, the input slab 3 is made to have a high refractive index region having a refractive index relatively higher than surrounding regions thereof at the vicinity of each coupling portion of the optical channel waveguide.

FIGS. 5(a) to 5(c) are diagrams for explaining the (electric field) intensity profile of a bundle of light beams propagating from the input slab 3 to the phase-grating waveguide array 4 of the arrayed waveguide grating type wavelength division multiplexer/demultiplexer as the first embodiment of the present invention. Unlike the arrangement shown in FIG. 3, the input slab 3 shown in FIGS. 5(a) to 5(c) is made to have the array of high refractive index regions in the above-described manner. Since the input slab 3 shown in FIGS. 5(a) to 5(c) has the array of high refractive index regions, the input slab 3 operates as follows. That is, when the light beams dispersed along the locus 80 from the light dispersion center 301 as a start point reach the wedge-shaped concave portions 304 or the vicinity thereof, the light beams are focused on the region (high refractive index region) interposed between the neighboring concave portions 304. This is because the thin portions of the core 103 at which the concave portions 304 are provided have a refractive index relatively lower than surrounding regions there of. Conversely, portions of the core having no concave portions 304, or portions of the core having the ordinary thickness will have a refractive index relatively higher than the thin portions of the core 103 at which the concave portions 304 are provided.

That is, the region sandwiched between a pair of concave portions adjacent to each other functions as an optical waveguide which leads the light beam into the corresponding optical channel of the phase-grating waveguide array 4. As a consequence, the light beams propagating from the input slab 3 to the phase grating 4 come to have small quantities of components having been dispersed by the gap G, with the result that the optical coupling loss brought about at the coupling portion between the input slab 3 and the phase grating 4 can be reduced.

FIGS. 6(a) to 6(e) are diagrams for explaining the (electric field) intensity profile and optical coupling condition of the light beams propagating from the input slab 3 to the phase-grating waveguide array 4. FIG. 6(a) is a cross-sectional view taken along the line C—C in FIGS. 1(a) and 5(a), FIG. 6(b) a diagram showing a light (electric field) intensity profile at a line Xc—Xc of FIG. 6(a), FIG. 6(c) a cross-sectional view taken along the line D—D in FIGS. 1(a) and 5(a), and FIG. 6(d) a diagram showing a light (electric field) intensity profile at a line Xd—Xd of FIG. 6(c). In FIG. 6(d), reference numeral E11a represents a light (electric field) intensity profile created when a plurality of light beams (electric fields) propagating through the phase-grating waveguide array 4 are superposed on one another. FIG. 6(e) is a diagram showing an electric field intensity profile E13 representing a lost electric field energy together with an electric field intensity profile E12 which is created by electric field energy successfully coupled to the phase-grating waveguide array 4.

As will be understood from FIGS. 6(a) to 6(e), according to the arrangement of the AWG wavelength division multiplexer/demultiplexer 1 of the present embodiment, the input slab 3 is configured to have a partially thin portions 304 provided on the core 103. Therefore, for example, the electric field intensity profile E10 created at the cross-sectional plane taken along the line C—C of FIG. 1(a) or 5(a) (this intensity profile corresponds to the electric field intensity profile 8 of FIG. 5(a)) comes to have peaks and bottoms as schematically shown in FIG. 6(a), for example.

Of the peaks and bottoms of the electric field intensity profile E10, positions of the bottoms correspond to positions of the gaps G of the phase-grating waveguide array 4, respectively, and positions of the peaks correspond to positions of the entrances of the optical channel waveguides constituting the phase-grating waveguide array 4, respectively. Therefore, if the electric field represented by the electric field intensity profile E10 shown in FIG. 6(b) and the electric field which is excited by the phase-grating waveguide array 4 to form the intensity profile E11a [see FIG. 6(d)] are superposed on one another, then an electric field intensity profile E13 noted by a hatched portion can be identified as a difference with respect to the electric field intensity profile E12 which is created by electric field energy successfully coupled to the phase-grating waveguide array 4. As will be understood from FIG. 6(e), the lost electric field energy represented by the hatched portion E13 becomes smaller as compared with the aforesaid case of FIG. 4(d) owing to the peak and bottom layout of the electric field intensity profile E10 shown in FIG. 6(b). As a result, the optical coupling loss brought about at the coupling portion between the input slab 3 and the phase-grating waveguide array 4 can be remarkably decreased as compared with a case in which there is no concave portions 304 provided.

In particular, according to the arrangement of the present example, each of the concave portions 304 is formed to have a wedge shape of which width is gradually expanded toward the phase-grating 4 (in the light beam propagating direction). Therefore, when the light beam approaches the concave portion 304, the light beam can be protected from dispersion due to the concave portion 304 itself. Moreover, the electric field intensity profile E10 can be made to have a shape which exhibits an improved similarity to that of the electric field intensity profile E11a deriving from the excitation by the phase-grating waveguide array 4. Accordingly, it becomes possible to obtain more advantageous effect in the optical coupling loss reduction as compared with a case where the concave portion is shaped into a simple rectangular one.

(A2) Description of Steps of Fabricating the Device

Now description will be hereinafter made on steps of fabricating the AWG wavelength division multiplexer/demultiplexer 1 having the array of concave portions 304 provided in the input slab 3 as described above with reference to FIGS. 7(a) to 7(d). Each of FIGS. 7(a) to 7(d) corresponds to a cross-sectional view taken along C—C in FIG. 1(a).

Figure 7A:
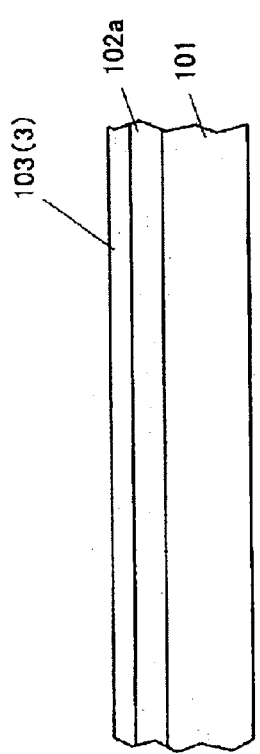
FIGS. 7(a) to 7(d) are diagrams for explaining steps of forming an array of concave portions on (the core layer of) the input slab of the arrayed waveguide grating type wavelength division multiplexer/demultiplexer as the first embodiment of the present invention.

Initially, as shown in FIG. 7(a), a silicon substrate 101 is prepared and a CVD (Chemical Vapor Deposition) method or the like is effected on the substrate 101 to deposit (pile) thereon an underside cladding 102a and the core 103 made of silica glass. The underside cladding 102a is made to have a thickness of 20 μm and the core 103 is made to have a thickness of 7 μm, for example.

Figure 7B:
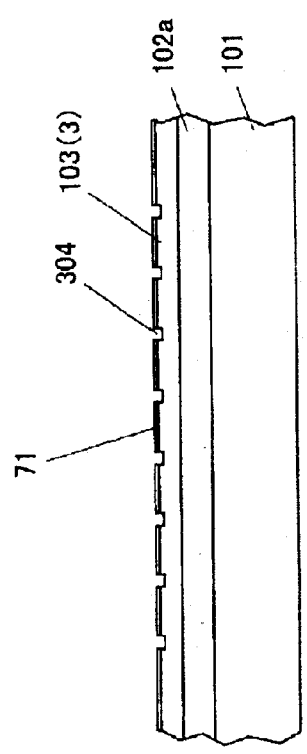

Subsequently, as shown in FIG. 7(b), a photolithography technology is utilized together with a reactive ion etching technology or the like to form a plurality of concave portions 304 so that each of the concave portions has a wedge-shape at a predetermined position. In FIG. 7(b), reference numeral 71 represents a mask utilized upon effecting the reactive ion etching technology. This mask 71 is made of a photosensitive organic material known as a photoresist.

Figure 7C:
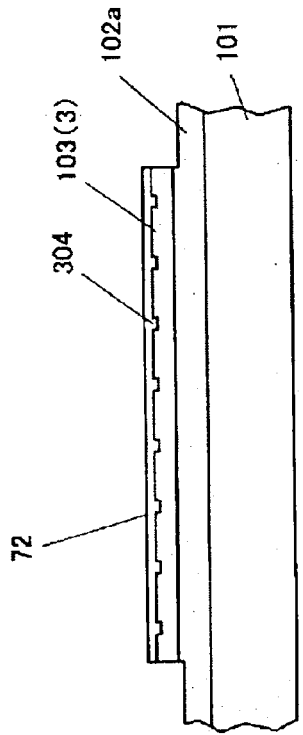

After removing the photoresist 71, as shown in FIG. 7(c), the photolithography technology is effected together with the reactive ion etching technology or the like to form a pattern of the input slab 3 (core pattern 3). Also in FIG. 7(c), reference numeral 72 represents a mask (photoresist) utilized upon effecting the reactive ion etching technology. In this step of fabrication, the input waveguide 2, the phase-grating waveguide array 4, the output slab 5, and the output waveguide 6 are formed as a core pattern.

Figure 7D:
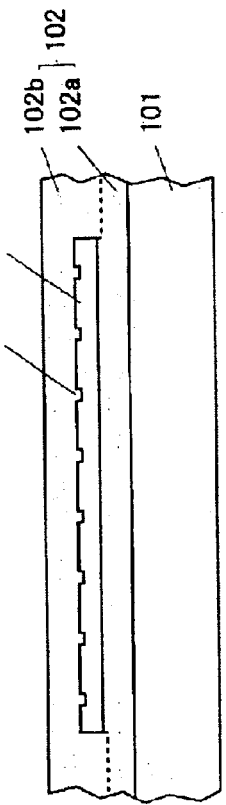

After removing the photoresist 72, a final fabrication step is executed as shown in FIG. 7(d). That is, an upper side cladding layer (over cladding) 102b covering the core 103 is formed so as to fill the concaves on the upper surface of the device. In this way, the AWG wavelength division multiplexer/demultiplexer 1 is fabricated.

As described above, according to the arrangement of the AWG wavelength division multiplexer/demultiplexer 1 as an embodiment of the present invention, the input slab 3 is configured to have the plurality of wedge-shaped concave portions 304 on the core 103 at the vicinity of each coupling portion between the input slab 3 and the phase grating 4 so that wedge-shaped concave portions 304 correspond to the layout of the respective optical channel waveguides of the phase-grating waveguide array 4. Thus, the portion of the core sandwiched between each pair of concave portions 304 adjacent to each other is made to have a refractive index relatively higher than surrounding portions thereof. Therefore, the light beams propagating from the input slab 3 to the phase grating 4 will be focused at the portion of the core sandwiched between each pair of concave portions 304 adjacent to each other, with the result that the focused light beams can be effectively led into the phase grating 4 and optical coupling with the phase grating 4 is effectively accomplished. Accordingly, the optical coupling loss caused by the gap G can be remarkably decreased.

In particular, according to the arrangement of the present embodiment, the distribution of the refractive index variation is created at the vicinity of each coupling portion between the input slab 3 and the phase grating 4 not by the conventional manner, i.e., an ultraviolet laser light irradiation, but by the variation of thickness of the core 103 depending on the layout of the optical channel waveguides of the phase grating 4. Therefore, the present invention can be applied to a case in which the core or the cladding is not doped with a dopant of Ge, Ti, Ce or the like. Moreover, since the refractive index variation distribution created in the device can be free from property change due to time passage regardless of the surrounding temperature. Therefore, the device of the present invention can be made more durable and it becomes possible to remarkably decrease the insertion loss change of the present device due to time passage. Furthermore, it becomes possible to reliably suppress the polarization dependent loss (PDL) caused by the volume change brought about in the core 103 due to the ultraviolet laser beam irradiation.

Further, according to the arrangement of the above example, each of the concave portions 304 is made to have a wedge shape of which width is gradually expanded toward the optical channel waveguide of the phase grating 4 (in the light beam propagating direction). Therefore, when the light beam approaches the concave portion 304, the light beam can be prevented from light dispersion due to the concave portion 304. Accordingly, it becomes possible to more effectively decrease the optical coupling loss brought about at the phase grating 4.

Meanwhile, if the depth of the concave portion 304 is varied, the difference in refractive index between the concave portion 304 and the portion of the core sandwiched between each pair of concave portions 304 adjacent to each other will be also varied correspondingly. For example, if the depth of the concave portion 304 is increased, the difference in refractive index will be also increased. Therefore, for example, if the phase-grating waveguide array 4 is arranged to have a plurality of optical channel waveguides arrayed at a relatively narrow regular interval, the interval of the concave portions 304 adjacent to each other may be also made narrow correspondingly. In addition to this arrangement of decreasing the interval of the concave portions 304 adjacent to each other, the concave portion 304 maybe made deepened so as to increase the difference in refractive index between the concave portion 304 and the portion of the core sandwiched between each pair of concave portions 304 adjacent to each other. It is needless to say that the arrangement of increasing the depth of the concave portion 304 may be solely effected without the arrangement of decreasing the interval of the concave portions 304 adjacent to each other. In this way, the light beam directed from the input slab 3 to the phase-grating waveguide array 4 can be made to have an intensity profile with a sharp peak, with the result that the optical coupling loss can be similarly decreased.

The depth of the concave portion 304 is not necessarily constant. For example, the concave portion 304 may be deepened toward the phase grating 4 (i.e., a cross-section of the concave portion 304 in the direction of the phase grating 4 will also have a wedge shape). If the concave portion 304 is arranged in this manner, a bundle of light beams directed from the input slab 3 to the phase grating 4 will be gradually concentrated and propagated at the portion sandwiched between each pair of concave portions 304 adjacent to each other as the bundle of light beams approaches the phase grating 4. Therefore, it becomes possible to improve the optical coupling efficiency at the phase grating 4 as compared with a case in which the concave portion 304 has no variation in its depth.

(B) Description of Second Embodiment (B1) Description of Arrangement and Operation FIGS. 8(*a*) to 8(*e*) are diagrams each for explaining a second embodiment of the present invention. Similarly to FIGS. 1(*a*) to 1(*e*), FIG. 8(*a*) is a plan view showing an AWG type wavelength division multiplexer/demultiplexer according to the second embodiment of the present invention, FIG. 8(*b*) a cross-sectional view taken along a line A—A in FIG. 8(*a*), FIG. 8(*c*) a cross-sectional view taken along a line B—B in FIG. 8(*a*), FIG. 8(*d*) a cross-sectional view taken along a line C—C in FIG. 8(*a*), and FIG. 8(*e*) a cross-sectional view taken along a line D—D in FIG. 8(*a*).

Reference numerals in FIG. 8(*a*) represent components corresponding to those shown in FIG. 1(*a*). That is, in FIG. 8, reference numeral 1 represents the AWG type wavelength division multiplexer/demultiplexer, 2 the input waveguide, 3 the input slab, 4 the phase-grating waveguide array, 5 the output slab, and 6 the output waveguide, respectively. Also in FIGS. 8(*b*) to 8(*e*), reference numeral 101 represents the silicon substrate, 102 the cladding made of silica glass, and 103 the core made of silica glass.

According to the arrangement of the subject embodiment, the core 103 and the cladding 102 are made to have refractive indices of which ratio of relative difference is 0.5%. The core 103 is made to have a thickness t of 7 $\mu$m. A thickness of the cladding 102 is collectively set to 20 $\mu$m together with the core 103 which is sandwiched between the upper portion of the cladding and the lower portion of the same. Further, the core 103 is made to have the thickness which is constant over the whole area of the layer. The input waveguide 2, the output waveguide 6 and each optical channel of the phase-grating waveguide array 4 are made to have a core width of 7 $\mu$m except for the tapered portions 401 and 402.

Further, the input slab 3 has an arc-shaped periphery contacted to the phase grating 4 and an radius r1 of the arc-shaped periphery is set to 40 mm. The plurality of optical channel waveguides of the phase-grating waveguide array 4 are arrayed at a regular interval (pitch) P1 which is set to 20 $\mu$m on the side of the input slab 3. The gap G is also interposed between each adjacent optical channel waveguides of the phase-grating waveguide array 4, and this gap G is set to 3.5 $\mu$m. The output slab 5 has an arc-shaped periphery contacted to the phase grating 4 and an radius r2 of the arc-shaped periphery is set to 40 mm. Also, the regular interval (pitch) P2 of the optical channel waveguides of the phase-grating waveguide array 4 is set to 20 $\mu$m on the side of the output slab 5, and a gap interposed between each adjacent optical channel waveguides on the side of the output slab 5 is set to 3.5 $\mu$m. In the following description, reference numerals in FIGS. 8(*a*) to 8(*e*) corresponding to those in FIGS. 1(*a*) to 1(*e*) or the like represent the same or substantially the same components having been described unless it is specifically noted.

According to the arrangement of the subject second embodiment, as shown in FIGS. 8(*a*) and 8(*d*), the cladding 102 covering the core 103 constituting the input slab 3 is configured to have an array of wedge-shaped concave portions (portions at which the thickness of the cladding is made small) 305. Each of the concave portions 305 is shaped to have a width with on the phase grating 4-side of 5 $\mu$m, a width on the input waveguide 2-side of 2.5 $\mu$m, a length of 1 mm, a depth of 15 $\mu$m.

As shown in FIG. 8(*a*), the array of the wedge-shaped concave portions (portions at which the thickness of the cladding is made small) 305 is provided in such a manner that a (geometrical) center line 308 between each pair of adjacent concave portions 305 provided on both the sides of the corresponding coupling portion of the optical channel waveguide of the phase-grating waveguide array 4 overlaps at the extension thereof (extended in the light propagation direction) with a center line 405 of the corresponding optical channel waveguide of the phase-grating waveguide array 4 (i.e., each of the wedge-shaped concave portions 305 is disposed at a position equivalent to that of each concave portion 304 provided on the core 103 of the first embodiment).

In other words, the AWG wavelength division multiplexer/demultiplexer 1 of the second embodiment has an arrangement different from that of the first embodiment in the following points. That is, unlike the arrangement of the first embodiment, the core 103 constituting the input slab 3 of the AWG wavelength division multiplexer/demultiplexer 1 of the second embodiment is flat. On the other hand, the cladding 103 covering the core 103 of the AWG wavelength division multiplexer/demultiplexer 1 of the second embodiment is configured to have a plurality of concave portions 305. The cladding 102 provided on the core 103 has a refractive index larger than that of air. Therefore, the cladding 102 will have, at the concave portion 305 with smaller thickness, a refractive index relatively smaller than surrounding portions thereof having relatively larger thickness.

Figure 9:
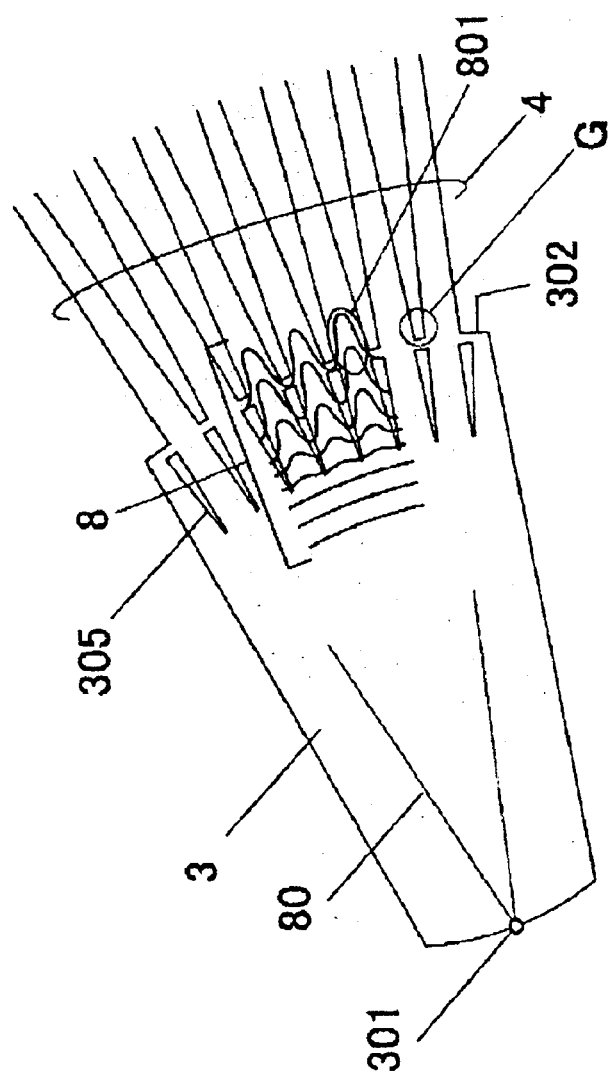
FIG. 9 is diagram for explaining the (electric field) intensity profile of the ray of light propagating from the input slab waveguide to the phase-grating waveguide array of the arrayed waveguide grating type wavelength division multiplexer/demultiplexer as the second embodiment of the present invention.

Light beams inherently have a nature of being concentrated at a portion having a relatively high refractive index. Therefore, as schematically shown in FIG. 9, a bundle of light beams 8 directed from the input slab 3 to the phase-grating waveguide array 4 are concentrated at the thin-thickness portion (concave portion) 305 (i.e., high refractive index region) provided on the cladding 102, and then led into the respective optical channel waveguides of the phase-grating waveguide array 4. In FIG. 9, reference numeral 801 represents an electric field intensity profile of the light beam which is concentrated by the portion sandwiched between the concave portions having the thin thickness of the cladding 102 and thereafter led into the optical channel waveguide of the phase grating 4.

FIGS. 10(a) to 10(e) are diagrams showing the light beam (electric field) intensity profile and optical coupling condition of the light beam propagating from the input slab 3 to the optical channel waveguides of the phase-grating waveguide array 4. Also in this case, similarly to the case of FIGS. 6(a) to 6(e), FIG. 10(a) is a cross-sectional view taken along the line C—C in FIG. 8(a), FIG. 10(b) a diagram showing a light (electric field)intensity profile at a line Xc—Xc of FIG. 10(a), FIG. 10(c) a cross-sectional view taken along the line D—D in FIG. 8(a), and FIG. 10(d) a diagram showing a light (electric field) intensity profile at a line Xd—Xd of FIG. 10(c). In FIG. 10(d), reference numeral E11a represents alight (electric field) intensity profile created when a plurality of light beams (electric fields) having intensity profile E11 propagating through the phase-grating waveguide array 4 are superposed on one another. FIG. 10(e) is a diagram showing an electric field intensity profile E13 representing a lost electric field energy together with an electric field intensity profile E12 which is created by electric field energy successfully coupled to the phase-grating waveguide array 4.

As will be understood from FIGS. 9 and 10(a) to 10(e), according to the arrangement of the AWG wavelength division multiplexer/demultiplexer 1 of the subject second embodiment, the input slab 3 is configured to have partially thin portions (concave portions) 305 provided on the cladding 102 on the input slab 3. Therefore, the light beam directed from the input slab 3 to the phase-grating waveguide array 4 comes to have an electric field intensity profile E10 having peaks and bottoms as shown in FIG. 10(b).

In this case, the layout of the concave portions 305 of the cladding 102 and the layout of the optical channel waveguides of the phase-grating waveguide array 4 are coordinated so that both of the layouts match with each other. In this case, the electric field intensity profile E10 on the input slab 3 [see FIG. 10(b)] and the electric field intensity profile E11a on the phase-grating waveguide array 4 [see FIG. 10(d)] match with each other in terms of peak-and-bottom correspondence. For this reason, of the light beams 8 directed from the input slab 3 to the phase-grating waveguide array 4, components subjected to the dispersion loss due to the gaps G, i.e., the loss portion E13 identified by the difference between the profile E10 and an electric field profile E12 which is created by electric field energy successfully coupled to the phase-grating waveguide array 4 can be made small as shown in FIG. 10(e). Thus, the coupling loss brought about at the coupling portion between the input slab 3 and the phase-grating waveguide array 4 can be decreased.

(B2) Description of Steps of Fabricating the Device

Now description will be hereinafter made on steps of fabricating the AWG wavelength division multiplexer/demultiplexer 1 having the array of concave portions 305 provided on the cladding 102 of the input slab 3 with reference to FIGS. 11(a) to 11(c). Each of FIGS. 11(a) to 11(c) is a cross-sectional view corresponding to that taken along C—C in FIG. 8(a).

Figure 11A:
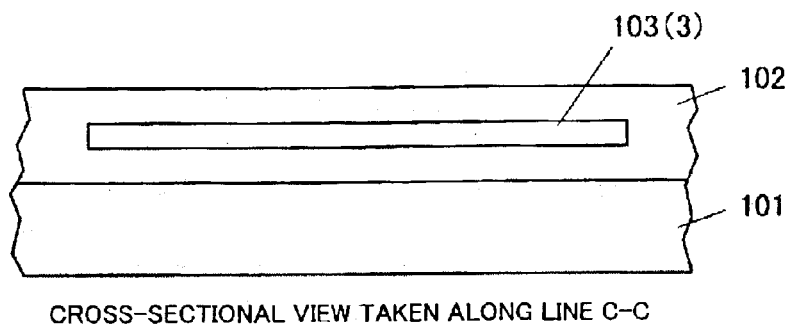
FIGS. 11(a) to 11(c) are diagrams for explaining steps of forming an array of concave portions on (the cladding layer of) the input slab of the arrayed waveguide grating type wavelength division multiplexer/demultiplexer as the second embodiment of the present invention.

Initially, as shown in FIG. 11(a), also the silicon substrate 101 of the second embodiment is prepared and a CVD method or the like is effected to deposit and form the cladding 102 and the core 103 made of silica glass on the substrate 101. In this process of fabrication, the input waveguide 2, the phase-grating waveguide array 4, the output slab 5 and the output waveguide 6 are formed. Further, the core 103 is made to have a thickness of 7 $\mu$m, and the cladding 102 provided under the core 103 is made to have a thickness of 20 $\mu$m and the cladding 102 provided on the core 103 is also made to have a thickness of 20 $\mu$m, respectively.

Figure 11B:
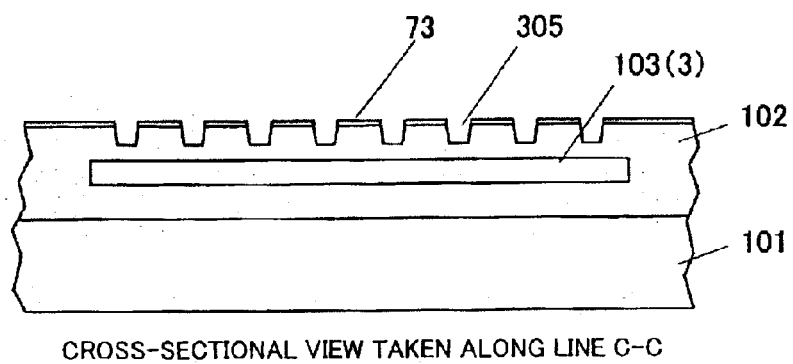
Figure 11C:
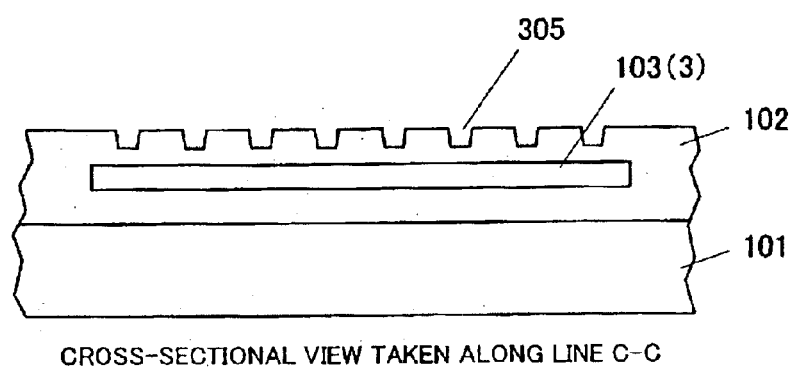

Subsequently, as shown in FIG. 11(b), a photolithography technology is utilized together with a reactive ion etching technology or the like to form the plurality of concave portions 305. Also in FIG. 11(b), reference numeral 73 represents a mask (photoresist (photosensitive organic material))utilized upon effecting the reactive ion etching technology. After effecting the reactive ion etching technology to form the plurality of concave portions 305, the mask 73 is removed as shown in FIG. 11(c). Thus, the AWG wavelength division multiplexer/demultiplexer 1 shown in FIG. 8 can be fabricated.

As described above, according to the arrangement of the AWG wavelength division multiplexer/demultiplexer 1 as the second embodiment of the present invention, the input slab 3 is configured to have the plurality of wedge-shaped concave portions 305 on the cladding 102 formed on the core 103 so that wedge-shaped concave portions 305 correspond to the layout of the respective optical channel waveguides of the phase-grating waveguide array 4. Thus, the portion of the core sandwiched between each pair of concave portions 305 adjacent to each other is made to have a refractive index relatively higher than surrounding portions thereof. Therefore, the light beams propagating from the input slab 3 to the phase grating 4 will be concentrated at the portion of the core sandwiched between each pair of concave portions 305 adjacent to each other, with the result that the focused light beams can be effectively led into the phase-grating waveguide array 4 and optical coupling to the phase-grating waveguide array 4 is accomplished. Accordingly, also in the case of second embodiment, the optical coupling loss caused by the gap G can be remarkably decreased.

In particular, according to the above-described arrangement of the second embodiment of the present invention, the concave portions 305 are formed on the surface of the cladding 102 of the input slab 3. Therefore, as described above with reference to FIGS. 11(a) to 11(c), it becomes easier to create the desired refractive index distribution in the input slab 3 with simpler fabrication process and higher accuracy. Of course, similarly to the case of the first embodiment, it becomes possible to reliably suppress the polarization dependent loss. Moreover, similarly to the case of the first embodiment, since each of the concave portions 305 is shaped into a wedge-shape, light beam dispersion due to the concave portion itself can be suppressed and the optical coupling loss can be more effectively decreased.

Also in the above-described example, the depth of each of the concave portions 305 having the wedge-shape may be adjusted to vary the difference in the refractive index between a portion having the concave portion 305 formed and a portion sandwiched between a pair of concave portions 305 adjacent to each other. If it is desired to obtain relatively large refractive index difference, the concave portion 305 may be formed to be deep. For example, if the phase-grating waveguide array 4 is composed of optical channel waveguides each having a relatively narrow width, the refractive index difference may be made large so that each light beam comes to have a light intensity profile with a sharp peak upon passing through the coupling portion between the input slab 3 and the phase-grating waveguide array 4. With this arrangement, the optical coupling loss brought about the coupling portion between the input slab 3 and the phase-grating waveguide array 4 will be decreased. In this way, each concave portion 305 may be formed to have a desired depth depending on the requested refractive index difference created at the coupling portion of the input slab 3.

In this case, as shown in FIG. 12(*d*), the concave portion 305 (305*a*) maybe formed to be deep so that the bottom face thereof reaches the upper surface of the core 103. Alternatively, as for example shown in FIG. 13(*d*), the concave portion 305 (305*b*) may be formed to be deeper than the upper surface of the core 103, i.e., the concave portion 305 (305*b*) may be formed to be deep so that the bottom face thereof reaches the inner area of the core 103 (in this case, a part of the core 103 is removed). FIGS. 12(*a*) to 12(*c*) and 12(*e*) correspond to FIGS. 8(*a*) to 8(*c*) and 8 (*e*), respectively, and hence the device shown in FIGS. 12(*a*) to 12(*c*) and 12 (*e*) has an arrangement substantially equivalent to that shown in FIGS. 8(*a*) to 8(*c*) and 8(*e*) at these cross-sections. Also, FIGS. 13(*a*) to 13(*c*) and 13(*e*) correspond to FIGS. 8(*a*) to 8 (*c*) and 8 (*e*), respectively, and hence the device shown in FIGS. 13(*a*) to 13(*c*) and 13(*e*) has an arrangement substantially equivalent to that shown in FIGS. 8(*a*) to 8(*c*) and 8(*e*) at these cross-sections.

If the arrangement of the concave portions 305 is made as described above, light beams directed from the input slab 3 to the phase-grating waveguide array 4 can be more effectively enclosed within a space between the concave portions 305*a* or 305*b*. Therefore, each light beam comes to have alight intensity profile with a sharp peak upon passing through the coupling portion between the input slab 3 and the phase-grating waveguide array 4. Accordingly, even if the phase-grating waveguide array 4 is composed of optical channel waveguides each having a relatively narrow width, for example, it becomes possible to obtain a necessary level of refraction index difference with ease without changing the layout of the concave portions 305. Thus, the optical coupling efficiency loss can be more improved.

Also in the case of the second embodiment and the modifications thereof, the depth of the concave portion 305 (305*a*, 305*b*) is not necessarily constant. For example, the concave portion 305 may be deepened toward the phase grating 4 (i.e., a cross-section of the concave portion 305 in the direction of the phase grating 4 will also have a wedge shape). If the concave portion 305 is arranged in this manner, a bundle of light beams directed from the input slab 3 to the phase grating 4 will be gradually concentrated and propagated at the portion sandwiched between each pair of concave portions 305 adjacent to each other as the bundle of light beams approaches the phase grating 4. Therefore, it becomes possible to improve the optical coupling efficiency at the phase grating 4 even if the light beam comes to have a light intensity profile with a very sharp peak.

(C) Description of Third Embodiment (C1) Description of Arrangement and Operation FIGS. 14(*a*) to 14(*e*) are diagrams for explaining a second embodiment of the present invention. Similarly to FIGS. 1(*a*) to 1(*e*), FIGS. 8(*a*) to 8(*e*), FIGS. 12(*a*) to 12(*e*), and FIGS. 13(*a*) to 13(*e*), FIG. 14(*a*) is a plan view showing an AWG type wavelength division multiplexer/demultiplexer according to the third embodiment of the present invention, FIG. 14(*b*) a cross-sectional view taken along a line A—A in FIG. 14(*a*), FIG. 14(*c*) a cross-sectional view taken along a line B—B in FIG. 14(*a*), FIG. 14(*d*) a cross-sectional view taken along a line C—C in FIG. 14(*a*), and FIG. 14(*e*) a cross-sectional view taken along a line D—D in FIG. 14(*a*).

Reference numerals are also introduced into FIGS. 14(*a*) to 14(*e*) in a similar manner so that they indicate the components corresponding to those in FIGS. 1(*a*) to 1(*e*), 8(*a*) to 8(*e*), 12(*a*) to 12(*e*) and 13(*a*) to 13(*e*). That is, reference numeral 1 represents the AWG type wavelength division multiplexer/demultiplexer, 2 the input waveguide, 3 the input slab, 4 the phase-grating waveguide array, 5 the output slab, and 6 the output waveguide, respectively. Also in FIGS. 14(*b*) to 14(*e*), reference numeral 101 represents the silicon substrate, 102 the cladding made of silica glass, and 103 the core made of silica glass. Further, the core 103 and the cladding 102 are made to have refractive indices of which ratio of relative difference is 0.5%. The core 103 is made to have a thickness t of 7 $\mu$m. A thickness of the cladding 102 is collectively set to 20 $\mu$m together with the core 103 which is sandwiched between the upper portion of the cladding and the lower portion of the same. Further, the core 103 is made to have the thickness which is constant over the whole area of the layer except for convex portions 306 which will be described later on. The input waveguide 2, the output waveguide 6 and each optical channel of the phase-grating waveguide array 4 are made to have a core width of 7 $\mu$m except for the tapered portions 401 and 402.

Further, the input slab 3 has an arc-shaped periphery contacted to the phase-grating 4 and an radius r1 of the arc-shaped periphery is set to 40 mm. The plurality of optical channel waveguides of the phase-grating waveguide array 4 are arrayed at a regular interval (pitch) P1 which is set to 20 $\mu$m on the side of the input slab 3. The gap G is also interposed between each adjacent optical channel waveguides of the phase-grating waveguide array 4, and this gap G is set to 3.5 $\mu$m. The output slab 5 has an arc-shaped periphery contacted to the phase-grating 4 and an radius r2 of the arc-shaped periphery is set to 40 mm. Also, the regular interval (pitch) P2 of the optical channel waveguides of the phase-grating waveguide array 4 is set to 20 $\mu$m on the side of the output slab 5, and a gap interposed between each adjacent optical channel waveguides on the side of the output slab 5 is set to 3.5 $\mu$m. In the following description, reference numerals in FIGS. 8(*a*) to 8(*e*) corresponding to those in FIGS. 1(*a*) to 1(*e*) or the like represent the same or substantially the same components having been described unless it is specifically noted.

According to the arrangement of the third embodiment, as shown in FIGS. 14(*a*) to 14(*d*), the core 103 constituting the input slab 3 is configured to have on its surface a plurality of wedge-shaped projections (convex portions, or portions of which thickness is locally made large) 306 each having a width on the phase grating 4-side of 10 $\mu$m, a width on the input waveguide 2-side of 1 $\mu$m, a length of 1 mm, and a height of 3 $\mu$m. These wedge-shaped convex portions 306 are arrayed so that the convex portions correspond to the layout of the optical channel waveguides of the phase grating 4, respectively. That is, the array of convex portions 306 is provided in such a manner that a (geometrical) center line 309 of each convex portion 306 overlaps at the extension 309 thereof extended toward the side of the phase-grating 4 (in the light propagation direction) with a center line 405 of the corresponding optical channel waveguide of the phase-grating waveguide array 4.

As described above, the AWG wavelength division multiplexer/demultiplexer 1 as the subject third embodiment has an arrangement different from that of the aforesaid second embodiment in the following points. That is, the core 103 constituting the input slab 3 is configured to have a plurality of wedge-shaped projections 306 and the array of convex portions 306 is provided in such a manner that the center line 309 of each convex portion 306 overlaps at the extension 309 thereof extended toward the side of the phase-grating waveguide array 4 with the center line 405 of the corresponding optical channel waveguide of the phase-grating waveguide array 4.

Figure 15:
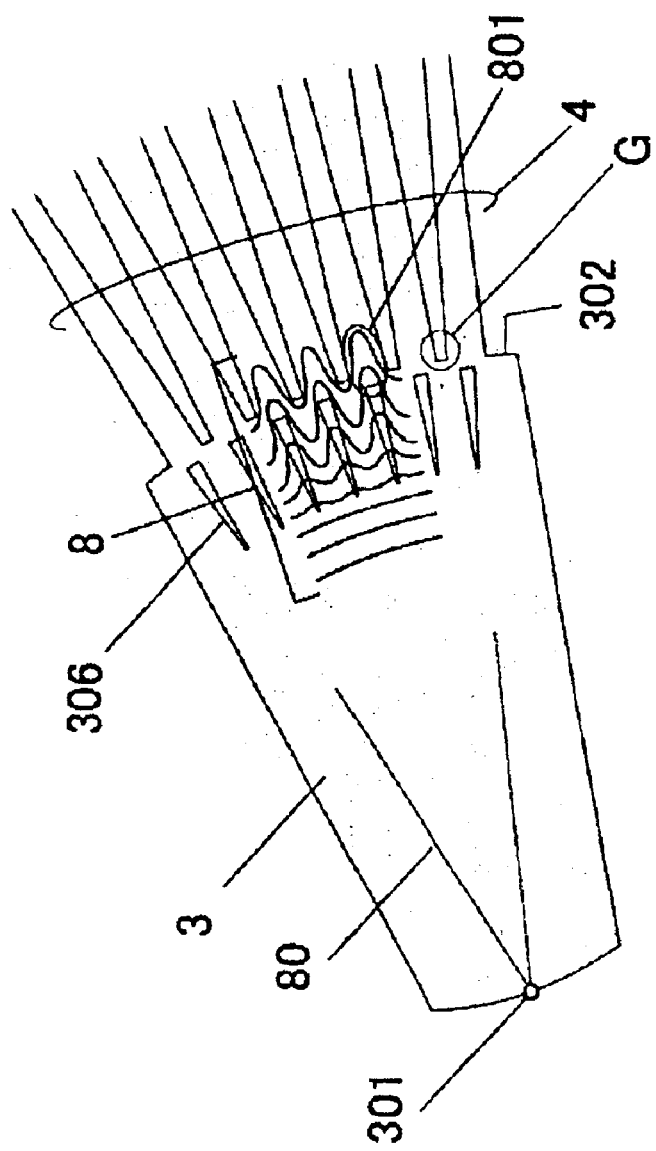
FIG. 15 is diagram for explaining the (electric field) intensity profile of the ray of light propagating from the input slab waveguide to the phase-grating waveguide array of the arrayed waveguide grating type wavelength division multiplexer/demultiplexer as the third embodiment of the present invention.

With this arrangement of the input slab 3 of the third embodiment, the portions of the core having a larger thickness is made to have a refractive index relatively larger than the surrounding portions thereof. Light beams inherently have a nature of being concentrated at a portion having a relatively high refractive index. Therefore, as shown in FIG. 15, a bundle of light beams 8 directed from the input slab 3 to the phase-grating waveguide array 4 are concentrated at the thick-thickness portion (convex portion) 306 (i.e., high refractive index region) provided on the cladding 102, and then led into the respective optical channel waveguides of the phase-grating waveguide array 4. In FIG. 15, reference numeral 801 represents an electric field intensity profile of the light beam which is concentrated by each convex portion 306 having the relatively larger thickness of the core 103 and thereafter led into the opposing optical channel waveguide of the phase grating 4.

FIGS. 16(*a*) to 16(*e*) are diagrams showing the light beam (electric field) intensity profile and optical coupling condition of the light beam propagating from the input slab 3 to the optical channel waveguides of the phase-grating waveguide array 4. Also in this case, similarly to the case of FIGS. 10(*a*) to 10(*e*), FIG. 16(*a*) is a cross-sectional view taken along the line C—C in FIG. 14(*a*), FIG. 16(*b*) a diagram showing a light (electric field) intensity profile at a line Xc—Xc of FIG. 14(*a*), FIG. 16(*c*) a cross-sectional view taken along the line D—D in FIG. 14(*a*), and FIG. 16(*d*) a diagram showing a light (electric field) intensity profile at a line Xd—Xd of FIG. 16(*c*). In FIG. 16(*d*), reference numeral E11a represents a light (electric field) intensity profile created when a plurality of light beams (electric fields) having intensity profile E11 propagating through the phase-grating waveguide array 4 are superposed on one another. FIG. 16(*e*) is a diagram showing an electric field intensity profile E13 representing a lost electric field energy together with an electric field intensity profile E12 which is created by electric field energy successfully coupled to the phase-grating waveguide array 4.

As will be understood from FIGS. 15 and 16(*a*) to 16(*e*), according to the arrangement of the AWG wavelength division multiplexer/demultiplexer 1 of the subject third embodiment, the input slab 3 is configured to have partially thick portions (convex portions) 306 provided on the core 103 of the input slab 3. Therefore, the light beam directed from the input slab 3 to the phase-grating waveguide array 4 comes to have an electric field intensity profile E10 having peaks and bottoms as shown in FIG. 16(*b*). In this case, the layout of the convex portions 306 of the core 103 and the layout of the optical channel waveguides of the phase-grating waveguide array 4 are coordinated so that the convex portions 306 of the core 103 oppose to the optical channel waveguides of the phase-grating waveguide array 4, respectively. In this case, the electric field intensity profile E10 on the input slab 3 [see FIG. 16(*b*)] and the electric field intensity profile E11a on the phase-grating waveguide array 4 [see FIG. 16(*d*)] match with each other in terms of peak-and-bottom correspondence. For this reason, of the light beams 8 directed from the input slab 3 to the phase-grating waveguide array 4, components subjected to the dispersion loss due to the gaps G, i.e., the loss portion E13 identified by the difference between the profile E1 and an electric field profile E12 which is created by electric field energy successfully coupled to the phase-grating waveguide array 4, can be made small as shown in FIG. 16(*e*). Thus, the coupling loss brought about at the coupling portion between the input slab 3 and the phase-grating waveguide array 4 can be decreased.

(C2) Description of Steps of Fabricating the Device as the Third Embodiment

Now description will be hereinafter made on steps of fabricating the AWG wavelength division multiplexer/demultiplexer 1 having the above-described array of projections (convex portions, or portions of which thickness is locally made large) 306 provided on the core 103 of the input slab 3 with reference to FIGS. 17(*a*) to 17(*d*). Each of FIGS. 17(*a*) to 17(*d*) corresponds to a cross-sectional view taken along C—C in FIG. 14(*a*).

Initially, as shown in FIG. 17(*a*), a silicon substrate 101 is prepared and a CVD (Chemical Vapor Deposition) method or the like is effected on the substrate 101 to deposit (pile) thereon an underside cladding 102*a* and the core 103 made of silica glass. The underside cladding 102*a* is made to have thickness of 20 $\mu$m and the core 103 is made to have a thickness of 10 $\mu$m, for example.

Subsequently, as shown in FIG. 17(*b*), a photolithography technology is utilized together with a reactive ion etching technology or the like to form the above-described plurality of convex portions 306. Also in FIG. 17(*b*), reference numeral 71 represents a mask (made of a photosensitive organic material known as photoresist) utilized upon effecting the reactive ion etching technology.

After removing the photoresist 71, as shown in FIG. 17(*c*), the photolithography technology is effected together with the reactive ion etching technology or the like to form a core pattern 3. In this step of fabrication, the input waveguide 2, the phase-grating waveguide array 4, the output slab 5, and the output waveguide 6 are formed as a core pattern. After removing the photoresist 72, a final fabrication step is executed as shown in FIG. 17(*d*). That is, an upper side cladding layer (over cladding) 102*b* is formed so as to cover the upper surface of the device. In this way, the AWG wavelength division multiplexer/demultiplexer 1 as the third embodiment is fabricated.

As described above, according to the arrangement of the AWG wavelength division multiplexer/demultiplexer 1 as the third embodiment of the present invention, the input slab 3 is configured to have the plurality of wedge-shaped convex portions 306 at the vicinity of each coupling portion between the input slab 3 and the phase grating 4 so that wedge-shaped convex portions 306 oppose to the layout of the respective optical channel waveguides of the phase-grating waveguide array 4. Thus, the region of convex portions 306 is made to have a refractive index relatively higher than surrounding portions thereof. Therefore, the light beams propagating from the input slab 3 to the phase grating 4 will be concentrated at the region of convex portions 306, with the result that the concentrated light beams can be effectively led into the phase grating 4 and optical coupling with the phase grating 4 is effectively accomplished.

Therefore, also in this case, similarly to the cases of the first and second embodiments, the optical coupling loss caused by the gap G can be remarkably decreased. Moreover, similarly to the cases of the first and second embodiments, polarization dependent loss can be reliably suppressed. Furthermore, similarly to the cases of the first and second embodiments, the convex portion 306 is shaped into a wedge shape. Therefore, light beam dispersion due to the convex portion 306 itself can be suppressed and the optical coupling loss can be more effectively decreased.

Meanwhile, if the height of the convex portion 306 (height with respect to the surrounding portions) is varied, the difference in refractive index between the convex portion 306 and the region having no convex portion 306 provided will be also varied correspondingly. For example, if the height of the convex portion 306 is increased, the difference in refractive index will be also increased. Therefore, also in this case, if the phase-grating waveguide array 4 is arranged to have a plurality of optical channel waveguides arrayed at a relatively narrow regular interval, the interval of the convex portions 306 arrayed in the surface direction may be also made narrow correspondingly. In addition to this arrangement of decreasing the interval of the convex portions 306 arrayed in the surface direction, the convex portion 306 may be made higher so as to increase the difference in refractive index between the convex portion 306 and the region having no convex portion 306 provided. It is needless to say that the arrangement of increasing the depth of the convex portion 306 may be solely effected without the arrangement of decreasing the interval of the convex portions 306 arrayed in the surface direction. In this way, the light beam directed from the input slab 3 to the phase-grating waveguide array 4 can be made to have an intensity profile with a sharp peak, with the result that the optical coupling efficiency can be improved.

Also in this case, the height of the convex portion 306 is not necessarily constant. For example, the convex portion 306 may be made higher toward the phase grating 4 (i.e., a cross-section of the convex portion 306 in the direction toward the phase grating 4 will also have a wedge shape). If the convex portion 306 is arranged in this manner, a bundle of light beams directed from the input slab 3 to the phase grating 4 will be gradually concentrated and propagated at the region having the convex portion 306 provided as the bundle of light beams approaches the phase grating 4. Therefore, even if the bundle of light beams directed from the input slab 3 to the phase grating 4 has an electric field intensity profile with very sharp peaks, the nature of the electric field intensity profile with very sharp peaks will be reasonably moderated at the coupling portion between the input slab 3 and the phase grating 4, with the result that the optical coupling efficiency at coupling portion between the input slab 3 and the phase grating 4 can be improved with ease.

While in the above-described embodiment the convex portions 306 of the wedge-shape are formed on the surface of the core 103 [see FIG. 14(d)], the convex portions 306 may be formed on the back surface of the core 103 (surface on the side of the silicon substrate 101) as shown in FIG. 18(b). Further, the convex portions 306 may be formed on both the surfaces of the core 103 as shown in FIG. 18(c). Both of the arrangements shown in FIGS. 18(b) and 18(c) will work in a manner similar to that of the aforesaid first to third embodiments to produce similar effects or advantages. FIG. 18(a) is a plan view of these modifications of the third embodiment, and this arrangement is substantially the same as that of the original third embodiment shown in FIG. 14(a). Also, FIGS. 18(b) and 18(c) are cross-sectional views taken along a line C—C in FIG. 18(a). In FIGS. 18(a) to 18(c), same or like parts corresponding to those of the aforesaid first to third embodiments are identified by the same reference numerals.

Now description will be hereinafter made on steps of fabricating the AWG wavelength division multiplexer/demultiplexer 1 which has the convex portions 306 provided on the back surface of the core 103 with reference to FIGS. 19(a) to 19(e). Each of FIGS. 19(a) to 19(e) corresponds to a cross-sectional view taken along C—C in FIG. 18(a).

Figure 19A:
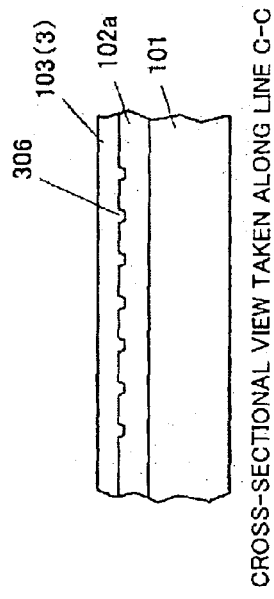
FIGS. 19(a) to 19(e) are diagrams for explaining steps of forming an array of convex portions on (the core layer of) the input slab of the arrayed waveguide grating type wavelength division multiplexer/demultiplexer shown in FIGS. 18(a) and 18(b)

Initially, as shown in FIG. 19(a), a silicon substrate 101 is prepared and a CVD method or the like is effected on the substrate 101 to deposit (pile) thereon an underside cladding 102a made of silica glass so that the underside cladding 102a has a thickness of 20 μm. Subsequently, as shown in FIG. 19(b), a photolithography technology is utilized together with a reactive ion etching technology or the like to form an array of wedge-shaped concave portions 306a. Also in FIG. 19(b), reference numeral 71 represents a mask (made of a photosensitive organic material known as photoresist) utilized upon effecting the reactive ion etching technology.

Figure 19C:
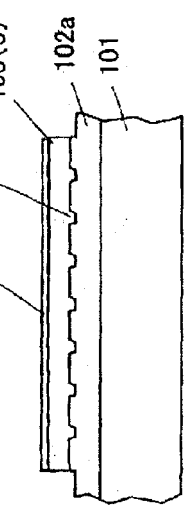
Figure 19D:
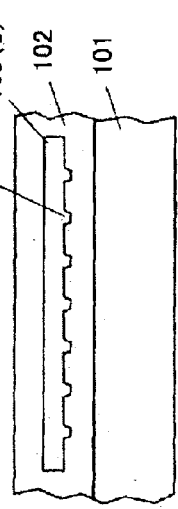
Figure 19B:
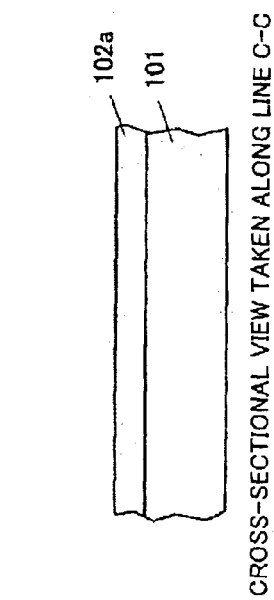

Subsequently, as shown in FIG. 19(c), the core 103 having a thickness of 7 μm is deposited (piled) and then as shown in FIG. 19(d), a photolithography technology is utilized together with a reactive ion etching technology or the like to form the core pattern 3. In this way, the above-described wedge-shaped concave portions 306a serve for creating the convex portions 306. Also in FIG. 19(d), reference numeral 71 represents a mask (made of a photosensitive organic material known as photoresist) utilized upon effecting the reactive ion etching technology. In this step of fabrication, the input waveguide 2, the phase-grating waveguide array 4, the output slab 5, and the output waveguide 6 are formed as a core pattern.

Figure 19E:
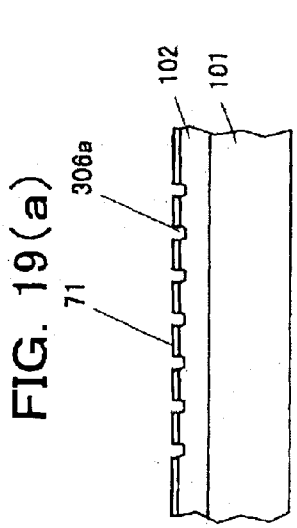
Figure 20A:
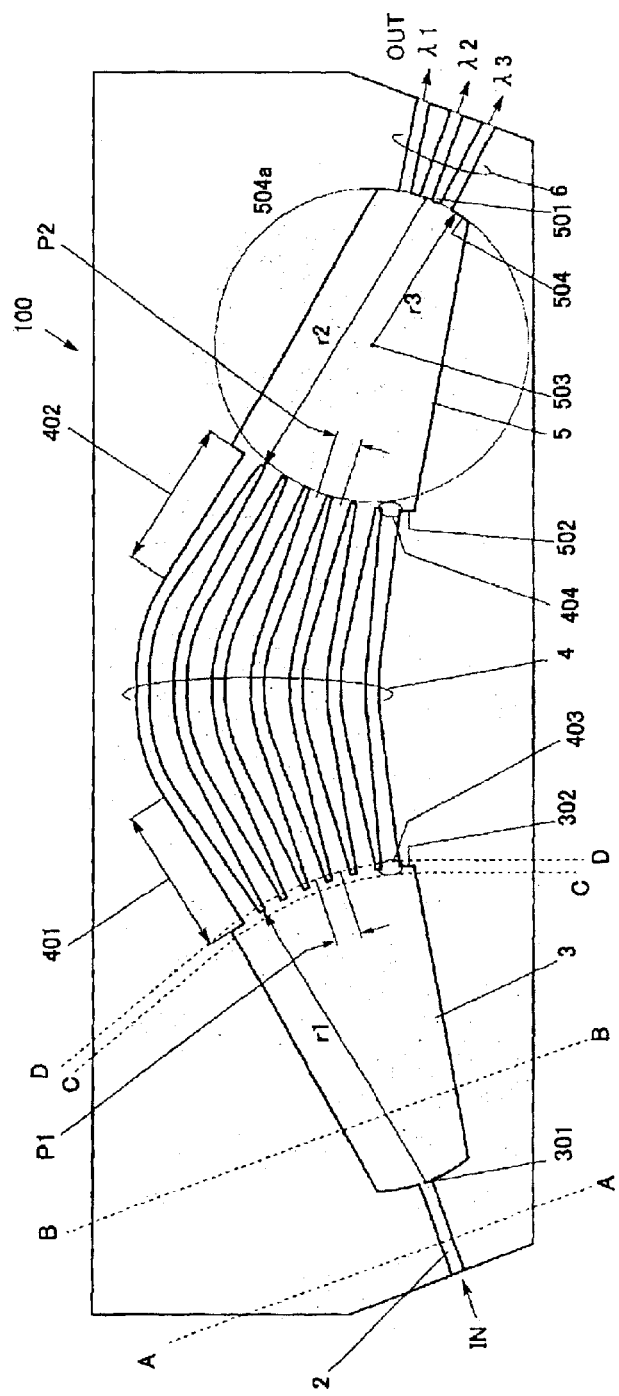
FIG. 20(a) is a plan view showing an arrayed waveguide grating type wavelength division multiplexer/demultiplexer employing conventional AWG optical channel waveguides.
Figure 20D:
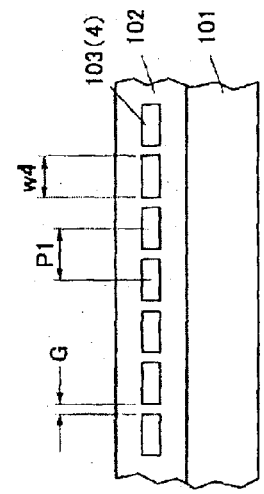
FIG. 20(d) is a cross-sectional view taken along a line D—D in FIG. 20(a)
Figure 20C:
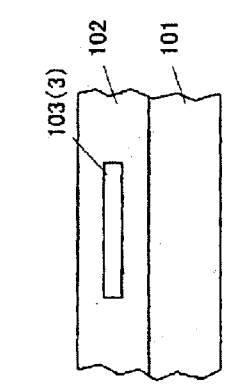
FIG. 20(c) is a cross-sectional view taken along a line B—B in FIG. 20(a)
Figure 20B:
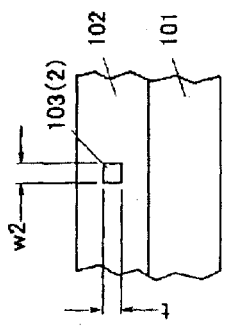
FIG. 20(b) is a cross-sectional view taken along a line A—A in FIG. 20(a)
Figure 23A:
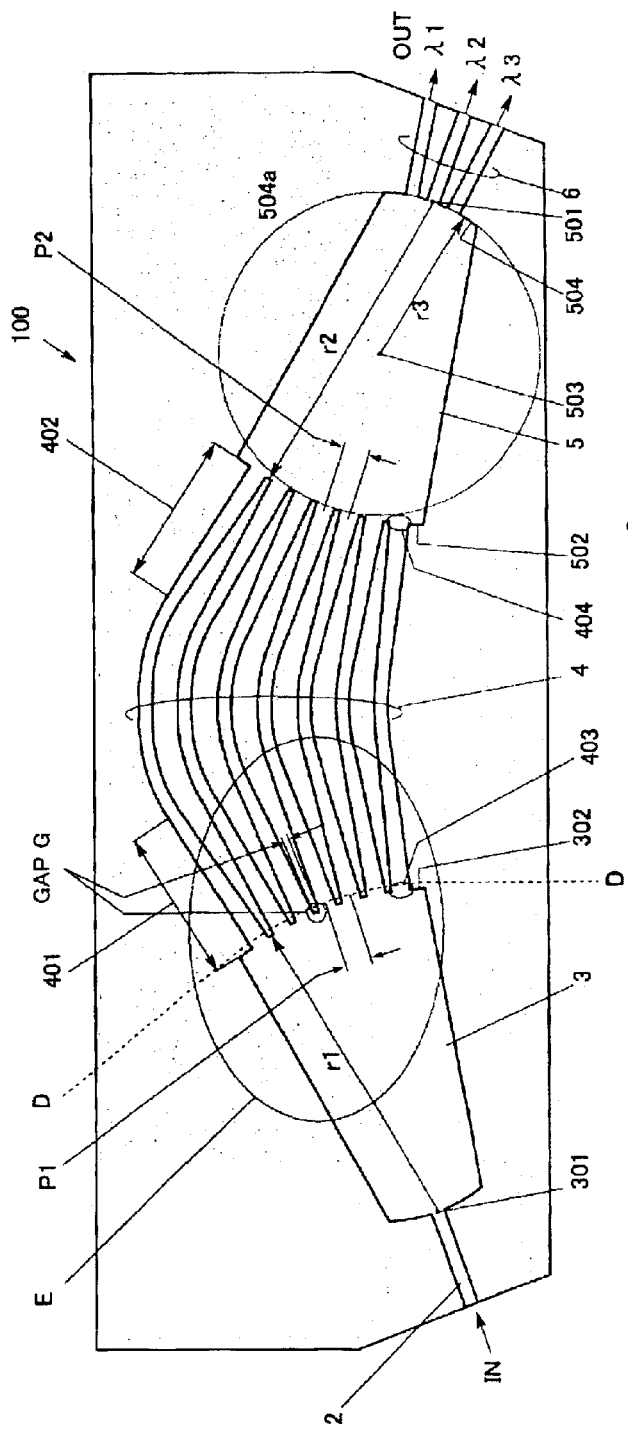
FIGS. 23(a) to 23(c) are diagrams for explaining an optical coupling loss caused by a gap provided in a coupling portion between the input slab waveguide and the phase-grating waveguide array of the conventional wavelength division multiplexer/demultiplexer.
Figure 23C:
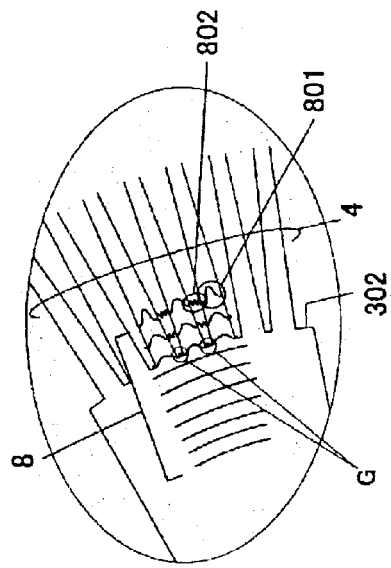
Figure 23B:
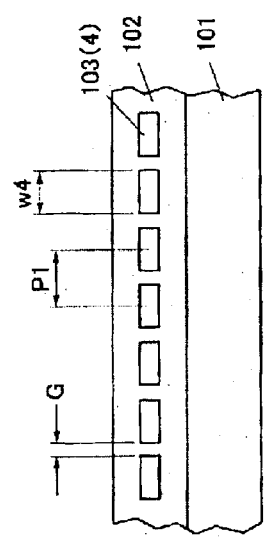
Figure 24:
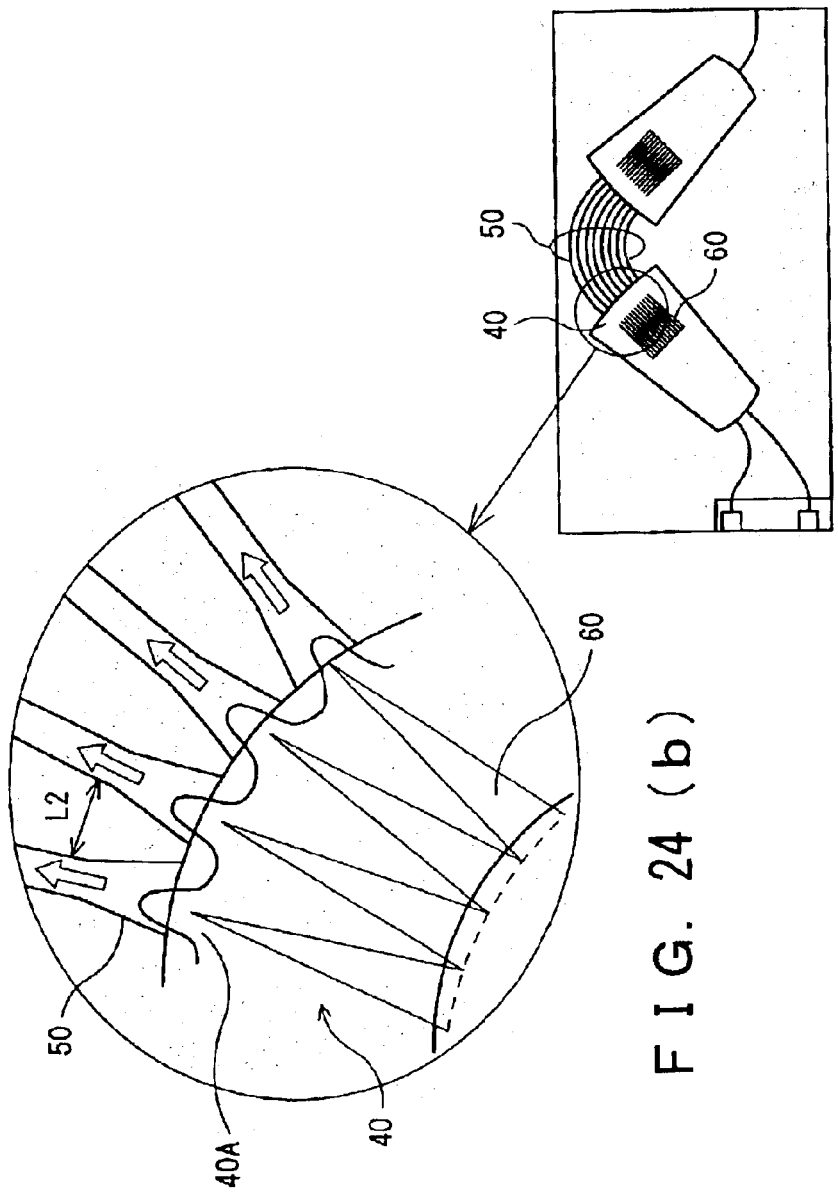
FIGS. 24(a) and 24(b) are diagrams showing an arrangement of another type of a conventional wavelength division multiplexer/demultiplexer.

After removing the photoresist 72, a final fabrication step is executed as shown in FIG. 19(e). That is, an upper side cladding 102b is formed so as to cover the upper surface of the core pattern 3 (thus, the cladding 102a and the cladding 102b collectively constitute the cladding 102). In this way, the AWG wavelength division multiplexer/demultiplexer 1 shown in FIGS. 18(a) and 18(b) is fabricated.

If it is desired to provide the array of convex portions 306 on both the sides of the core 103 constituting the input slab 3 as shown in FIG. 18(c), the fabrication steps described with reference to FIGS. 17(b) to 17(d) may be executed after the status of fabrication step shown in FIG. 19(c).

Also in the above-described modifications of the third embodiment of the present invention, the height of the convex portions 306 may be varied to change the difference in refractive index between the region having the concave portion 306 provided and a region having no convex portion 306 provided. If the array of convex portions 306 are provided on both the sides of the core 103, the height variation may be effected on the array of the convex portions 306 provided on one side of the core 103 and the array of the convex portions 306 provided on the other side of the same in a different manner or in a similar manner.

(D) Other Disclosure

While in the above-described respective embodiments the wedge-shaped concave portions 304 and 305 or the wedge-shaped convex portions 306 are provided only on the input slab 3, these wedge-shaped concave portions 304 and 305 or the wedge-shaped convex portions 306 may be provided also on the output slab 5. Further, while in the above-described respective embodiments description has been made mainly on the demultiplexing function of the AWG wavelength division multiplexer/demultiplexer 1, the AWG wavelength division multiplexer/demultiplexer 1 has a fundamental multiplexing function similar to those of conventional type of AWG wavelength division multiplexer/demultiplexer.

Further, design factors such as the dimensions, materials and the like employed for the components of the device such as the core 103, the cladding 102 and the like are merely examples. Therefore, it is needless to say that these design factors are not limited to these examples. Furthermore, while in the above-described embodiments the concave portions 304 and 305 or the convex portions 306 are formed into a wedge-shaped, the concave portions 304 and 305 or the convex portions 306 should not necessarily be formed into such a shape but some modification can be permissible so long as the shape can have a function to suppress the light beam dispersion due to the concave portions 304 and 305 or the convex portions 306 themselves.

Although certain preferred embodiments and modifications of the present invention have been shown and described in detail, it is needless to say that the present invention is not limited to the above-described embodiments and modifications but various changes and modifications may be effected without departing from the spirit or scope of the present invention.

What is claimed is:

1. An arrayed waveguide grating type wavelength division demultiplexer having a waveguide grating array which is composed of a substrate, a cladding layer provided on the substrate and a core layer provided in the cladding layer so as to form a predetermined pattern, comprising:

an input waveguide for propagating a plurality of input light beams having respective wavelengths;

an input slab waveguide for allowing a free propagation of the light beams from the input waveguide;

a phase-grating waveguide array comprising a plurality of optical channel waveguides for propagating the light beams from the input slab waveguide, each of the optical channel waveguides having a waveguide length different from one another by a predetermined length, and each optical channel waveguide having a coupling portion coupling the respective optical channel waveguide to the input slab waveguide;

an output slab waveguide for allowing a free propagation of the light beams from the plurality of optical channel waveguides of the phase-grating waveguide array, and focusing the light beams at a different position depending on the wavelength of the light beams; and a plurality of output waveguides for propagating the light beams focused by the output slab waveguide, respectively, wherein the input waveguide, the input slab waveguide, the phase-grating waveguide array, the output slab waveguide, and the plurality of output waveguides are provided in the core layer so as to form the predetermined pattern, and the input slab waveguide is configured to have portions with locally varied thickness in at least one of the core layer and the cladding layer at the vicinity of each coupling portion depending on the layout of the optical channel waveguides, whereby the input slab waveguide is made to have a high refractive index region having a refractive index relatively higher than surrounding regions thereof at the vicinity of each coupling portion.

2. An arrayed waveguide grating type wavelength division demultiplexer according to claim 1, wherein the portions with locally varied thickness of the input slab waveguide are an array of concave portions provided on the core layer at the vicinity of each coupling portion.

3. An arrayed waveguide grating type wavelength division demultiplexer according to claim 2, wherein the array of concave portions is provided in such a manner that a geometrical center line between each pair of adjacent concave portions provided on both the sides of a corresponding coupling portion overlaps at the extension thereof extended in the light propagation direction with a center line of a corresponding optical channel waveguide.

4. An arrayed waveguide grating type wavelength division demultiplexer according to claim 3, wherein each of the concave portions is formed to have a wedge shape of which width is gradually expanded toward the corresponding optical channel waveguide.

5. An arrayed waveguide grating type wavelength division demultiplexer according to claim 3, wherein each of the concave portions is formed to have a wedge shape of which depth is gradually deepen toward the corresponding optical channel waveguide.

6. An arrayed waveguide grating type wavelength division demultiplexer according to claim 1, wherein the portions with locally varied thickness of the input slab waveguide are an array of concave portions provided on the cladding layer at the vicinity of each coupling portion.

7. An arrayed waveguide grating type wavelength division demultiplexer according to claim 6, wherein the array of concave portions is provided in such a manner that a geometrical center line between each pair of adjacent concave portions provided on both the sides of a corresponding coupling portion. overlaps at the extension thereof extended in the light propagation direction with a center line of a corresponding optical channel waveguide.

8. An arrayed waveguide grating type wavelength division demultiplexer according to claim 7, wherein bottom faces of the concave portions provided on the cladding layer reach a surface of the core layer constituting the input slab waveguide.

9. An arrayed waveguide grating type wavelength division demultiplexer according to claim 7, wherein bottom faces of the concave portions provided on the cladding layer reach an inner area of the core layer constituting the input slab waveguide.

10. An arrayed waveguide grating type wavelength division demultiplexer according to claim 6, wherein bottom faces of the concave portions provided on the cladding layer reach a surface of the core layer constituting the input slab waveguide.

11. An arrayed waveguide grating type wavelength division demultiplexer according to claim 6, wherein bottom faces of the concave portions provided on the cladding layer reach an inner area of the core layer constituting the input slab waveguide.

12. An arrayed waveguide grating type wavelength division demultiplexer according to claim 6, wherein each of the concave portions is formed to have a wedge shape of which width is gradually expanded toward a corresponding optical channel waveguide.

13. An arrayed waveguide grating type wavelength division demultiplexer according to claim 6, wherein each of the concave portions is formed to have a wedge shape of which depth is gradually deepen toward a corresponding optical channel waveguide.

14. An arrayed waveguide grating type wavelength division demultiplexer according to claim 1, wherein the portions with locally varied thickness of the input slab waveguide are an array of convex portions provided on the core layer at the vicinity of each coupling portion.

15. An arrayed waveguide grating type wavelength division demultiplexer according to claim 14, wherein the array of convex portions is provided in such a manner that a geometrical center line of each convex portion overlaps at an extension thereof extended in a light propagation direction with a center line of a corresponding optical channel waveguide.

16. An arrayed waveguide grating type wavelength division demultiplexer according to claim 15, wherein the array of convex portions is provided on one surface of the core layer.

17. An arrayed waveguide grating type wavelength division demultiplexer according to claim 15, wherein the array of convex portions is provided on a top and bottom surface of the core layer.

18. An arrayed waveguide grating type wavelength division demultiplexer according to claim 14, wherein the array of convex portions is provided on one surface of the core layer.

19. An arrayed waveguide grating type wavelength division demultiplexer according to claim 14, wherein the array of convex portions is provided on a top and bottom surface of the core layer.

20. An arrayed waveguide grating type wavelength division demultiplexer according to claim 14, wherein each of the convex portions is formed to have a wedge shape of which width is gradually expanded toward a corresponding optical channel waveguide.

21. An arrayed waveguide grating type wavelength division demultiplexer according to claim 14, wherein each of the convex portions is formed to have a wedge shape of which height is gradually increased toward a corresponding optical channel waveguide.

22. An apparatus comprising:
   an input waveguide propagating a plurality of input light beams having different, respective wavelengths;
   an input slab waveguide allowing a free propagation of the light beams from the input waveguide, the input slab waveguide formed of a core layer and a cladding layer;
   a phase-grating waveguide array comprising a plurality of optical channel waveguides propagating the light beams from the input slab waveguide, each of the optical channel waveguides having a waveguide length different from one another by a predetermined length, and each optical channel waveguide having a coupling portion coupling the respective optical channel waveguide to the input slab waveguide;
   an output slab waveguide allowing a free propagation of the light beams from the plurality of optical channel waveguides of the phase-grating waveguide array, and focusing the light beams at different positions depending on the wavelengths of the light beams; and
   a plurality of output waveguides propagating the light beams focused by the output slab waveguide, respectively,
   wherein the input slab waveguide includes portions with locally varied thickness in at least one of the core layer and the cladding layer at a vicinity of each coupling portion depending on a layout of the optical channel waveguides, whereby the input slab waveguide is made to have a high refractive index region having a refractive index relatively higher than surrounding regions thereof at the vicinity of each coupling portion.

23. An apparatus according to claim 22, wherein the portions with locally varied thickness of the input slab waveguide are an array of concave portions provided on the core layer at the vicinity of each coupling portion.

24. An apparatus according to claim 22, wherein the portions with locally varied thickness of the input slab waveguide are an array of concave portions provided on the cladding layer at the vicinity of each coupling portion.

25. An apparatus according to claim 22, wherein the portions with locally varied thickness of the input slab waveguide are an array of convex portions provided on the core layer at the vicinity of each coupling portion.

* * * * *

UNITED STATES PATENT AND TRADEMARK OFFICE
CERTIFICATE OF CORRECTION

PATENT NO.   : 6,920,264 B2  
DATED        : July 19, 2005  
INVENTOR(S)  : Haruhiko Tabuchi Page 1 of 1

It is certified that error appears in the above-identified patent and that said Letters Patent is hereby corrected as shown below:

Column 30,
Line 38, after "portion" delete ".".

Signed and Sealed this

Seventh Day of March, 2006

JON W. DUDAS  
*Director of the United States Patent and Trademark Office*